United States Patent
Cho et al.

(10) Patent No.: US 10,107,895 B2
(45) Date of Patent: Oct. 23, 2018

(54) AMPLITUDE CALIBRATION OF A STEPPED-CHIRP SIGNAL FOR A SYNTHETIC APERTURE RADAR

(71) Applicant: The Boeing Company, Seal Beach, CA (US)

(72) Inventors: Kwang M. Cho, Los Angeles, CA (US); Kenneth W. Conte, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 866 days.

(21) Appl. No.: 14/491,291

(22) Filed: Sep. 19, 2014

(65) Prior Publication Data
US 2017/0160381 A1   Jun. 8, 2017

(51) Int. Cl.
G01S 13/93   (2006.01)
G01S 7/40    (2006.01)
G01S 13/90   (2006.01)

(52) U.S. Cl.
CPC ............ G01S 7/4004 (2013.01); G01S 13/90 (2013.01)

(58) Field of Classification Search
CPC ...... G01S 13/02; G01S 13/878; G01S 13/931; G01S 2013/9332; G01S 2013/9375; G01S 2013/9378
USPC ........................................................ 342/59
See application file for complete search history.

(56) References Cited

U.S. PATENT DOCUMENTS

| | | |
|---|---|---|
| 4,723,124 A | 2/1988 | Boles |
| 4,924,229 A | 5/1990 | Eichel et al. |
| 4,978,961 A | 12/1990 | Williams et al. |
| 4,999,635 A | 3/1991 | Niho |
| 5,260,708 A | 11/1993 | Auterman |
| 5,463,397 A | 10/1995 | Frankot |
| 5,627,543 A | 5/1997 | Moreira |
| 6,046,695 A | 4/2000 | Poehler et al. |
| 6,608,586 B1 | 8/2003 | Doerry |
| 6,650,274 B1 | 11/2003 | Krikorian et al. |
| 6,864,828 B1 | 3/2005 | Golubiewski et al. |
| 6,873,285 B2 | 3/2005 | Carrara et al. |
| 6,965,341 B1 | 11/2005 | Cho et al. |
| 7,245,250 B1 | 7/2007 | Kalayeh |
| 7,397,418 B1 | 7/2008 | Doerry et al. |
| 7,728,757 B2 | 6/2010 | Cho |

(Continued)

FOREIGN PATENT DOCUMENTS

EP    2180338 A1    4/2010

OTHER PUBLICATIONS

V. C. Koo, T. S. Lim, H. T. Chuah, "A Comparison of Autofocus Algorithms for Sar Imagery", Progress in Electromagnetics Research Symposium 2005, Hangzhou, China, Aug. 22-26, pp. 16-19.

(Continued)

*Primary Examiner* — Timothy A Brainard
(74) *Attorney, Agent, or Firm* — Apogee Law Group P.C.; Francisco A. Rubio-Campos

(57) ABSTRACT

A Radar Calibration Processor ("RCP") for calibrating the amplitude of a stepped-chirp signal utilized by a synthetic aperture radar ("SAR") is disclosed. The RCP includes a periodic amplitude error ("PAE") calibrator, first non-periodic amplitude error ("NPAE") calibrator in signal communication with the PAE calibrator, and a second NPAE calibrator in signal communication with the first NPAE calibrator.

22 Claims, 21 Drawing Sheets

(56) References Cited

U.S. PATENT DOCUMENTS

| | | | |
|---|---|---|---|
| 7,760,128 | B1 | 7/2010 | Doerry et al. |
| 7,843,377 | B2 | 11/2010 | Connell et al. |
| 7,973,699 | B2 | 7/2011 | Krikorian et al. |
| 7,999,724 | B2 | 8/2011 | Cho |
| 8,102,299 | B2 | 1/2012 | Young et al. |
| 8,903,342 | B1 * | 12/2014 | Wyse ............... H03F 3/45085 330/257 |
| 2013/0106651 | A1 | 5/2013 | Goldstein et al. |
| 2014/0015710 | A1 | 1/2014 | Jin |

OTHER PUBLICATIONS

Y. K. Chan, V. C. Koo, "An Introduction to Synthetic Aperture Radar (SAR)" Progress in Electromagnetics Research B vol. 2, 27-60, 2008.

D. Prince Winston, M. Saravanan, "Single Parameter Fault Identification Technique for DC Motor through Wavelet Analysis and Fuzzy Logic", J Electr Technol vol. 8, No. 5: 1049-1055, 2013.

Jeffrey A. Rudin, "Implementation of Polar Format SAR Image Formation on the IBM Cell Broadband Engine", Mercury Computer Systems, Inc. 2007.

Bo Liu, Wenge Chang, "Range Alignment and Motion Compensation for Missile-Borne Frequency Stepped Chip Radar", Progress in Electromagnetics Research, vol. 136, 523-542, 2013.

Thomas Hill, Shigetsune Torin, "Impulse Response as a Measurement of the Quality of Chirp Radar Pulses", RF Products (RTSA), Tektronix, Inc., Jun. 2010.

Marius Pedersen, "Image Quality Metrics for the Evaluation of Printing Workflows", Doctoral Dissertation, Faculty of Mathematics and Natural Sciences at the University of Oslo, Series 1124, pp. 1-394, 2011.

Armin W. Doerry, "Wavefront Curvature Limitations and Compensation to Polar Format Processing for Synthetic Aperture Radar Images", Sandia Report, Sandia National Laboratories, SAND2007-0046 Unlimited Release, pp. 1-60, 2007.

Armin W. Doerry, "Anatomy of a SAR Impulse Response", Sandia Report, Sandia National Laboratories, SAND2007-5042 Unlimited Release, pp. 1-40, 2007.

Alan Chalmers, Scott Daly, Ann McNamara, Karol Myszkowski, Tom Troscianko, "Image Quality Metrics", Course #44, SIGGRAPH 2000, Jul. 23-28, 2000, pp. 1-117.

H. J. Callow, M. P. Hayes, P. T. Gough, "Stripmap Phase Gradient Autofocus", Acoustics Research Group, Dept. of Electrical and Computer Engineering, 0-933957-31-9, pp. 2414-2421.

"CMETA—Complex SAR Imagery Data Extension", pp. 1-52.

Patrick Berens, "Introduction to Synthetic Aperture Radar (SAR)", Research Institute for High-Frequency Physics and Radar Techniques (FHR), Research Establishment for Applied Science (FGAN), RTO-EN-SET-086, pp. 1-14.

"Analysis of the Finite Element Method", Chapter 7, pp. 1-32.

"Image Quality Metrics", MIT 2.717, Image Quality Metrics p-1, pp. 1-29.

Jen King Jao, "Theory of Synthetic Aperture Radar Imaging of a Moving Target", IEEE Transactions on Geoscience and Remote Sensing, vol. 39, No. 9, Sep. 2001, pp. 1984-1992.

Patrick M. Knupp, "Achieving Finite Element Mesh Quality Via Optimization of the Jacobian Matrix Norm and Associated Quantities. Part II—A Framework for Volume Mesh Optimization and the Condition Number of the Jacobian Matrix", International Journal for Numerical Methods in Engineering, 2000, 48:1165-1185.

Andrea Monto Guarnieri, Claudi Prati, "ScanSAR Focusing and Interferometry", Dipartimento di Elettronica e Informazione, pp. 1-19.

James S. Bates, "The Phase Gradient Autofocus Algorithm with Range Dependent Stripmap SAR", Thesis submitted to the faculty of Brigham Young University, Department of Electrical and Computer Engineering, Brigham Young University, 1998, pp. 1-103.

Samuel W. McCandless, Jr., Christopher R. Jackson, "Chapter 1. Principles of Synthetic Aperture Radar", SAR Marine User's Manual, pp. 1-23.

"Synthetic Aperture Radar (SAR) Summary", pp. 1-5.

Gregory Mazzaro, Kelly Sherbondy, Brian Phelan, Francois Koenig, "Introduction to Stepped-Frequency Radar", US Army RDECOM, ALC 204/3D013, Jun. 7, 2013, pp. 1-22.

"Superheterodyne Handout", EE354, pp. 1-5.

Ali F. Yegulalp, "Minimum Entropy SAR Autofocus", MIT Lincoln Laboratory, Mar. 10, 1999, pp. 1-27.

* cited by examiner

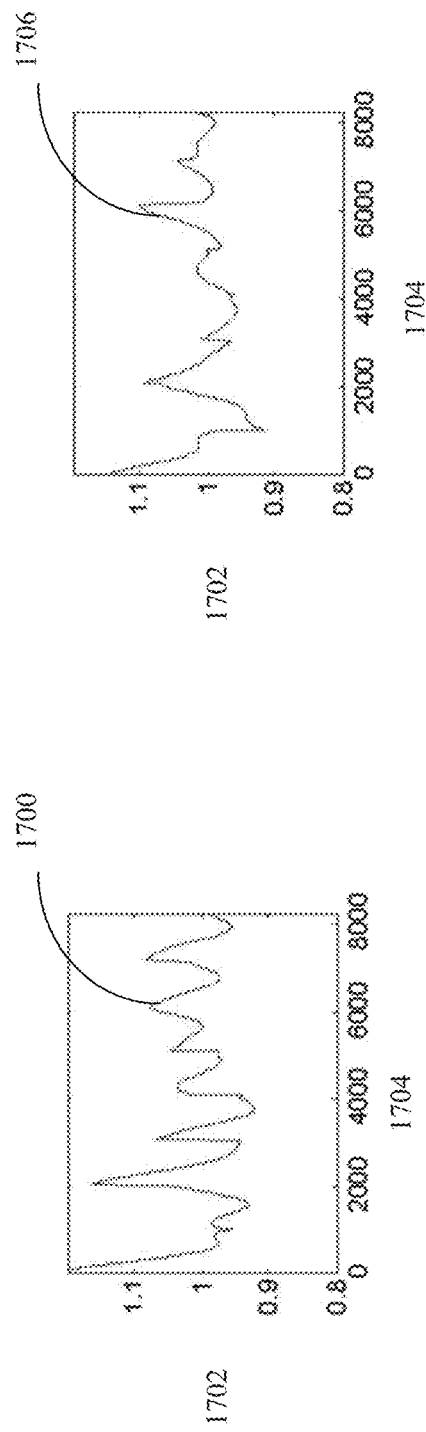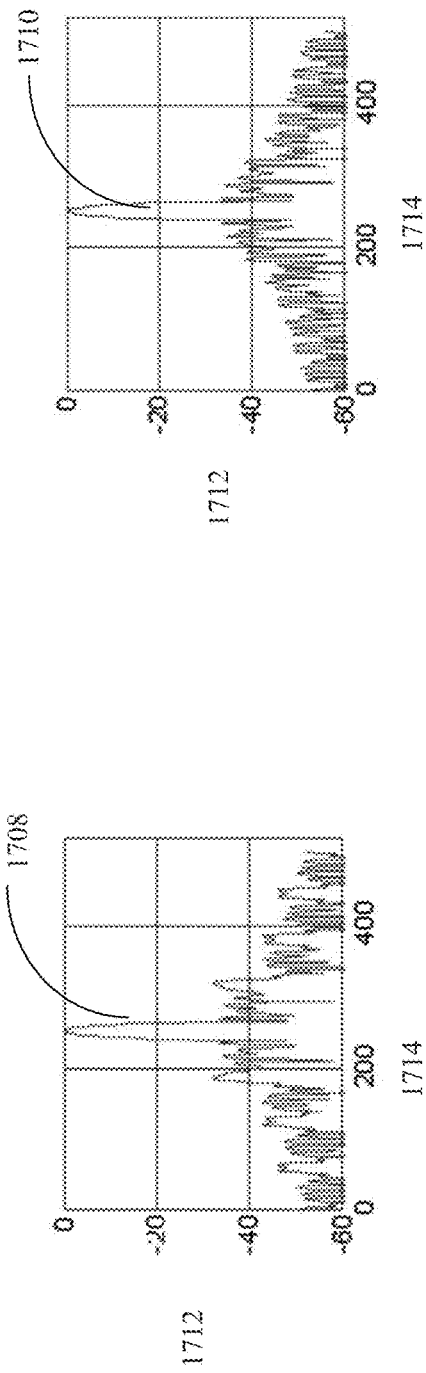

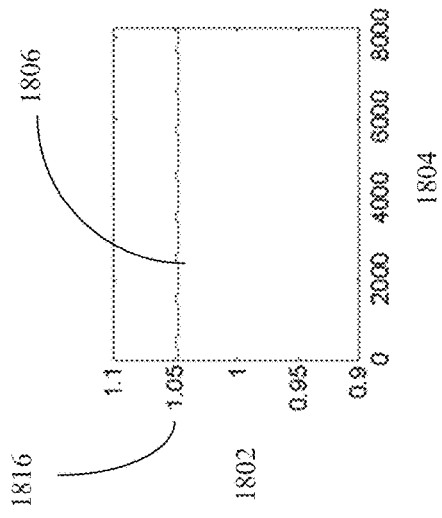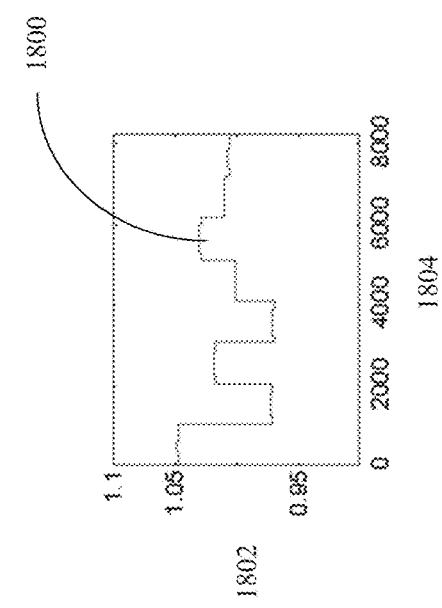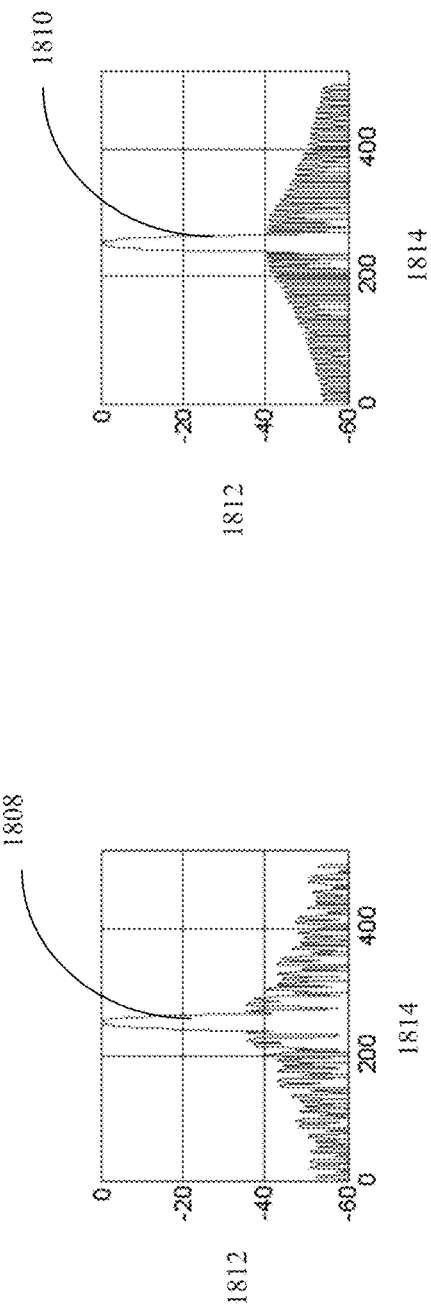
FIG. 18A
FIG. 18B
FIG. 18C
FIG. 18D

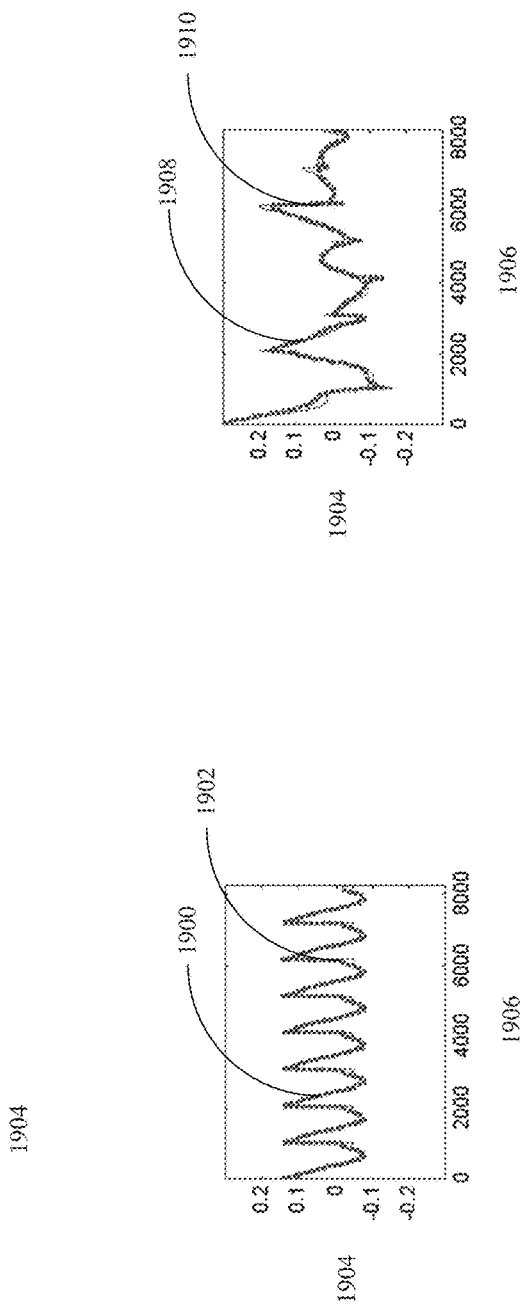
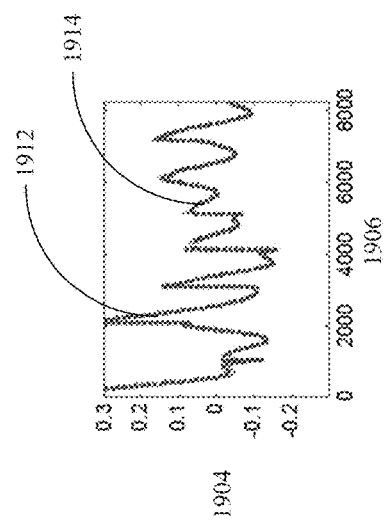
FIG. 19A
FIG. 19B
FIG. 19C

AMPLITUDE CALIBRATION OF A STEPPED-CHIRP SIGNAL FOR A SYNTHETIC APERTURE RADAR

STATEMENT REGARDING FEDERALLY SPONSORED RESEARCH AND DEVELOPMENT

This invention was made with United States Government ("USG") support. The government has certain rights in the invention.

CROSS-REFERENCE TO RELATED APPLICATIONS

This application is related to U.S. patent application Ser. No. 14/491,354, titled "PHASE CALIBRATION OF A STEPPED-CHIRP SIGNAL FOR A SYNTHETIC APERTURE RADAR," filed on Sep. 19, 2014, to inventor Kwang M. Cho, which application issued as U.S. Pat. No. 9,952,313 on Apr. 24, 2018, which is herein incorporated by reference in its entirety.

BACKGROUND OF THE INVENTION

1. Field of the Invention

The present disclosure is generally related to radar systems and more specifically to correcting errors in Synthetic Aperture Radar ("SAR") data.

2. Related Art

Radar has long been used for military and non-military purposes in a wide variety of applications such as imaging, guidance, remote sensing and global positioning. A Synthetic Aperture Radar ("SAR") is a coherent mostly airborne or spaceborne side-looking radar system ("SLAR") which utilizes the flight path of a moving platform (i.e., a vehicle such as, for example an aircraft or satellite), on which the SAR is located, to simulate an extremely large antenna or aperture electronically, and that generates high-resolution remote sensing imagery. Specifically, a SAR is used for terrain mapping and/or remote sensing using a relatively small antenna installed on the moving platform in the air.

The fact that a SAR may utilize a small antenna is a major advantage over a SLAR because the beamwidth of the radiation pattern of an antenna (generally known as the "antenna beamwidth") is inversely proportional to the dimension of antenna aperture and, in general, the more narrow the antenna beamwidth, the higher the potential resolution of a scanned image of a target area. As such, the image of the target area formed by a SLAR is poor in azimuth resolution because the azimuth antenna beamwidth has an angular resolution that is too broad to differentiate between fine details at the same range within the target area. Therefore for an SLAR, either an extremely large antenna or very high frequency of operation (where the wavelengths are so short that the radar must content with the effects of severe attenuation in the atmosphere) needs to be utilized to produce high resolution images of target areas for direct terrain mapping and/or remote sensing, which is unrealistic for a radar system installed on a moving platform.

SAR solves the problems associated with SLAR by utilizing a smaller antenna and signal processing. Unlike a SLAR, a SAR is able to achieve the same effect of a large antenna by transmitting an array of pulses using a small aperture antenna and coherently processing the resulting data reflected from the terrain for all transmitted pulses. In general, SAR is a technique that utilizes signal processing to improve the resolution beyond the limitation of the physical antenna aperture on the platform where the forward motion of actual antenna is used to 'synthesize' a very long antenna. As such, SAR allows the possibility of using longer wavelengths and still achieving good resolution with antennas that have structures of reasonable size.

In an example of operation, the SAR moves with the platform along a flight path over a target and transmits successive pulses of radio waves to illuminate a target scene, receives and records the echo (i.e., the radar return signal) of each pulse, and then generates a high-resolution image of the target scene from processing the received echo pulses. In this way, the SAR works similar to a phased array system, but contrary of a large number of the parallel antenna elements of a phased array, the SAR uses one antenna in time-multiplex. As such, the different geometric positions of the antenna of the SAR, as a result of moving the platform, simulate the antenna elements of a phased array.

The SAR transmits the pulses at pulse repetition frequency ("PRF") rate, which represents the number of pulses that are transmitted by the SAR per second. The reciprocal of RF is also known as the pulse collection period or inter-pulse period. Each pulse is radiated (i.e., transmitted) at the carrier frequency of operation of the SAR during a transmit time (generally referred to as the pulse with ("PW")). The SAR then waits for the returning echoes (i.e., the radar return signals) during a listening, or rest, time and then radiates the next pulse. The time between each transmitted pulse is known as the pulse repetition time ("PRT") that represents the time between the beginning of one pulse and the start of the next pulse.

Over time, individual transmit and receive cycles (having a period of operation equal to the PRT) of pulses are completed by the SAR with the data from each cycle being stored electronically by a processor within the SAR. The data includes all the radar returned signals, as amplitude and phase values, for a time period "T" from a first position to second position of the SAR along the flight path. At this point, it is possible to reconstruct a radar return signal that would have been obtained by an antenna of length v·T, where "v" is the platform speed along the flight path.

The SAR then preforms signal processing on the stored data. The signal processing utilizes the magnitudes and phases of the received radar return signals over successive pulses from elements of a synthetic aperture. After a given number of cycles, the stored data is recombined (taking into account the Doppler effects inherent in the different transmitter to target geometry in each succeeding cycle) to create a high resolution image of the terrain being over flown by the SAR.

It is noted that as the line of sight direction changes along the flight path of the platform of the SAR, a synthetic aperture is produced by signal processing, where the signal processing has the effect of artificially lengthening the antenna of the SAR. As such, making T large makes the "synthetic aperture" of the SAR antenna large and hence a higher resolution of the SAR may be achieved.

In general, the SAR images produced by a SAR are two-dimensional images that consist of range and cross-range (i.e., the azimuth) direction values. It is appreciated by those or ordinary skill in the art that the azimuth resolution is inversely proportional to the collection period T during which targets are illuminated by the antenna beam. Therefore, a fine resolution in azimuth may be achieved by increasing the array time for a spotlight mode or by reducing the antenna aperture size for stripmap mode. Additionally, the range resolution is inversely proportional to the bandwidth of the transmitted signal. As such, a fine resolution in range may be achieved by increasing the bandwidth of transmitted signal.

Unfortunately, although it is true that in theory the range resolution may be improved by utilizing a wideband signal, it is also true that, in practice, increasing the bandwidth of transmitted signal beyond certain point is costly and difficult to physically implement in reality. This is because typically front-end hardware components in a radar system includes filters, amplifiers, and an antenna—all of which generally have degraded performance as the signal bandwidth of operation increases.

One approach to avoid this problem has been to divide the full desired wideband signal into a sequence of multiple narrow sub-band signals and transmit the sub-band signals in consecutive sub-pulses with stepped center frequencies. Then, the received signals reflected from any backscatters, for each transmitted pulse, are combined to produce a composite received signal that is equivalent to a received signal from a wideband signal that had been transmitted.

In SAR systems the most commonly utilized waveform signals are linear frequency modulation ("LFM") signals. LFM signals are commonly referred to as "chirp modulation signals." They employ sinusoidal waveforms whose instantaneous frequency increases or decreases linearly over time. It is appreciated by those of ordinary skill in the art that these sinusoidal waveforms have advantages over other types of waveforms and are commonly referred to as "linear chirps" or simply "chirps."

Specifically, in a mode called "step chirp" or "stepped-chirp," a stepped-chirp waveform is utilized to improve the range resolution of an existing pulse compression radar such as a SAR. The pulse is frequency modulated so as to help resolve targets which may have overlapping returns and where a desired full wideband signal is divided into multiple narrow-band sub-bands with their center frequencies stepped between them. The sub-band signals are sequentially transmitted in sub-pulses. Then, the signals reflected from backscatters on ground, from each transmitted sub-pulse, are received and combined to synthesize a wideband composite received signal that is utilized to produce a high resolution SAR image. Generally, this technique is suitable for obtaining high range resolution in a radar system that has a limited instantaneous bandwidth, but a large tunable bandwidth.

Although SAR images of high range resolution may be obtained by utilizing a step chirp process, there is still a need to avoid degradation of the image quality due to amplitude and phase errors in the composite signal produced from all the sub-pulses. Both amplitude and phase errors in the composite signal may include periodic components which are common to all steps and non-periodic components which vary between steps. Additionally, amplitude and phase discontinuities may occur at the step boundaries of a stepped-chirp waveform.

These errors are a problem in step chirp that can degrade formed SAR image if not properly estimated and corrected. In particular, periodic errors may cause undesirable paired echoes in formed image. Additionally, the non-periodic errors and amplitude and phase discontinuities also may cause image degradation in sidelobe area of the impulse response. Therefore, there is a need to estimate and correct these amplitude and phase errors.

Attempts to solve this problem in the past include a method for estimating the amplitude and phase error in single-step signal as described in U.S. Pat. No. 7,999,724, titled "Estimation and Correction Of Error In Synthetic Aperture Radar," which issued Aug. 16, 2011 to inventor Kwang M. Cho and is herein incorporated by reference in its entirety. Unfortunately, this reference is limited in its disclosure to a single-step SAR and does not describe any way of correcting for errors in a step-chirp SAR.

As such, there continues to be a need in the art for a system and method to estimate and correct these amplitude and phase errors in a step chirp SAR system.

SUMMARY

Disclosed is a Radar Calibration Processor ("RCP") for calibrating the amplitude of a stepped-chirp signal utilized by a synthetic aperture radar ("SAR"). The RCP includes a periodic amplitude error ("PAE") calibrator, first non-periodic amplitude error ("NPAE") calibrator in signal communication with the PAE calibrator, and a second NPAE calibrator in signal communication with the first NPAE calibrator.

In an example of operation, the RCP preforms a method that calibrates the amplitude of the stepped-chirp signal by receiving SAR image data from an acquired radar target area that was scanned with a SAR utilizing a plurality of stepped-chirp signals and calibrating the amplitudes of the stepped-chirp signals. The calibration of the amplitude is performed by estimating the amplitude errors in the stepped-chirp signals. The RCP performs this method by sequentially first calibrating the SAR image data with the PAE calibrator to remove periodic amplitude errors in the SAR image data. The RCP then calibrates the PAE calibrated SAR image data with the first NPAE calibrator to remove type-1 non-periodic amplitude errors from the PAE calibrated SAR image data to produce NPAE-1 calibrated SAR image data. The RCP then calibrates the NPAE-1 calibrated SAR image data with the second NPAE calibrator to remove type-2 non-periodic amplitude errors from the NPAE-1 calibrated SAR image data to produce NPAE-2 calibrated SAR image data. The RCP then passes the NPAE-2 calibrated SAR image data to other parts to the SAR for use in producing a SAR display image.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 17A is a plot of the initial input amplitude error before PAE calibration as a function of amplitude versus range frequency samples.

FIG. 17B is a plot of the residual amplitude error after PAE calibration as a function of amplitude versus range frequency samples.

FIG. 17C is a plot of the corresponding impulse response ("IPR") of the input amplitude error (shown in FIG. 17A) as a function of amplitude versus range frequency samples.

FIG. 17D is a plot of the corresponding IPR of the residual amplitude error after PAE calibration (shown in FIG. 17B) as a function of amplitude versus range frequency samples.

FIG. 18A is a plot of the amplitude errors after the second stage NPAE-1 calibration as a function of amplitude versus range frequency samples.

FIG. 18B is a plot of the amplitude errors after the third stage NPAE-2 calibration as a function of amplitude versus range frequency samples.

FIG. 18C is a plot of the corresponding IPR prior to NPAE-2 calibration but after NPAE-1 calibration as a function of amplitude versus range frequency samples.

FIG. 18D is a plot of the corresponding IPR after NPAE-2 calibration as a function of amplitude versus range frequency samples.

FIG. 19A is a plot of the actual and estimated PAE error as function of amplitude versus range frequency samples.

FIG. 19B is a plot of the actual and estimated NPAE error as function of amplitude versus range frequency samples.

FIG. 19C is a plot of the actual and estimated combined PAE and NPAE errors as function of amplitude versus range frequency samples.

DETAILED DESCRIPTION

Disclosed is a Radar Calibration Processor ("RCP") for calibrating the amplitude of a stepped-chirp signal utilized by a synthetic aperture radar ("SAR"). The RCP includes a periodic amplitude error ("PAE") calibrator, first non-periodic amplitude error ("NPAE") calibrator in signal communication with the PAE calibrator, and a second NPAE calibrator in signal communication with the first NPAE calibrator.

In an example of operation, the RCP preforms a method that calibrates the amplitude of the stepped-chirp signal by receiving SAR image data from an acquired radar target area that was scanned with a SAR utilizing a plurality of stepped-chirp signals and calibrating the amplitudes of the stepped-chirp signals. The calibration of the amplitudes is performed by estimating the amplitudes errors in the stepped-chirp signals. The RCP performs this method by sequentially first calibrating the SAR image data with the PAE calibrator to remove periodic amplitude errors in the SAR image data. The RCP then calibrates the PAE calibrated SAR image data with the first NPAE calibrator to remove type-1 non-periodic amplitude errors from the PAE calibrated SAR image data to produce NPAE-1 calibrated SAR image data. The RCP then calibrates the NPAE-1 calibrated SAR image data with the second NPAE calibrator to remove type-2 non-periodic amplitude errors from the NPAE-1 calibrated SAR image data to produce NPAE-2 calibrated SAR image data. The RCP then passes the NPAE-2 calibrated SAR image data to other parts to the SAR for use in producing a SAR display image.

Figure 1A:
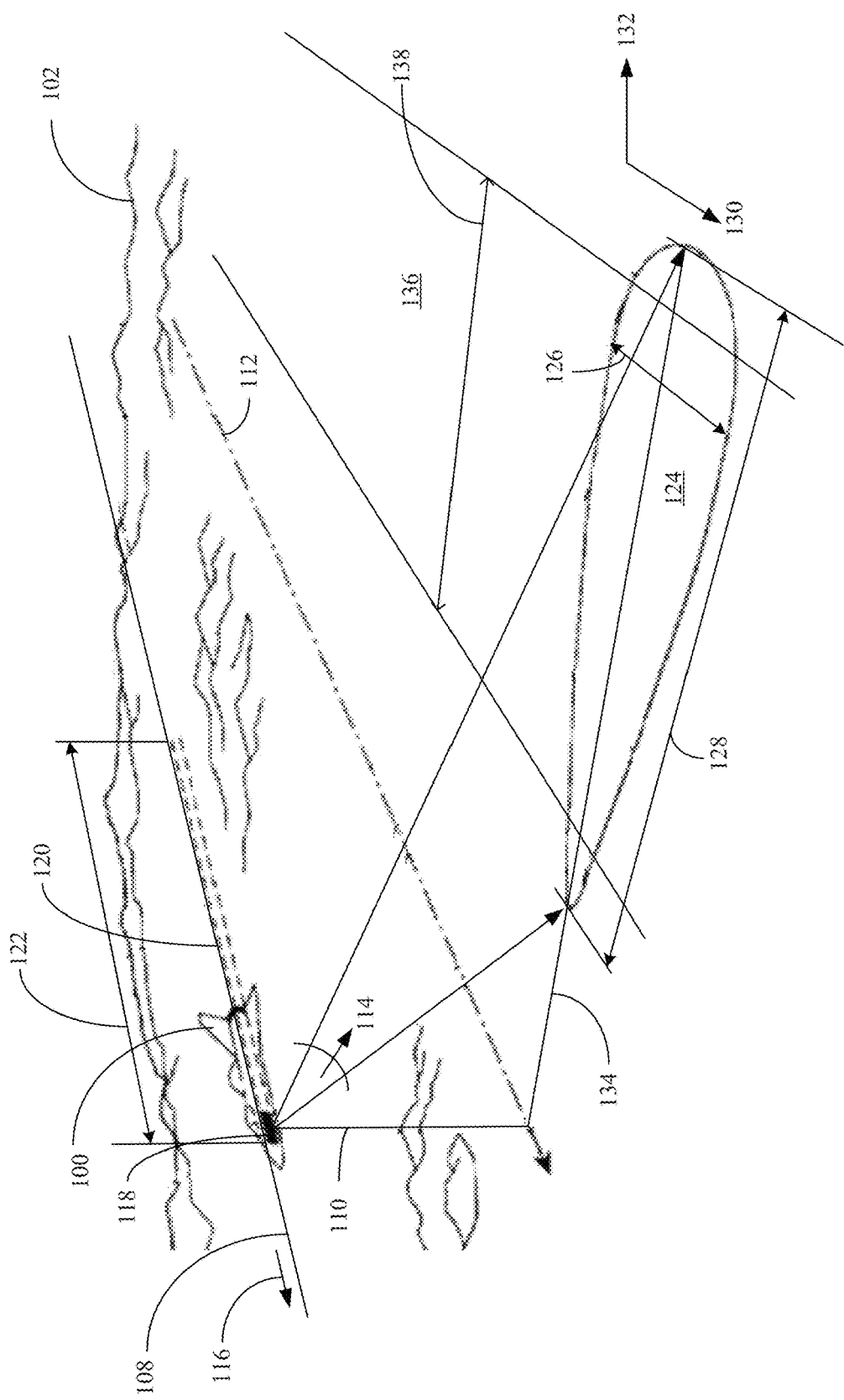
FIG. 1A is diagram of an example of a synthetic aperture radar ("SAR") imaging system on an aircraft flying a course along a flight path over a landmass in accordance with the present invention.
Figure 1B:
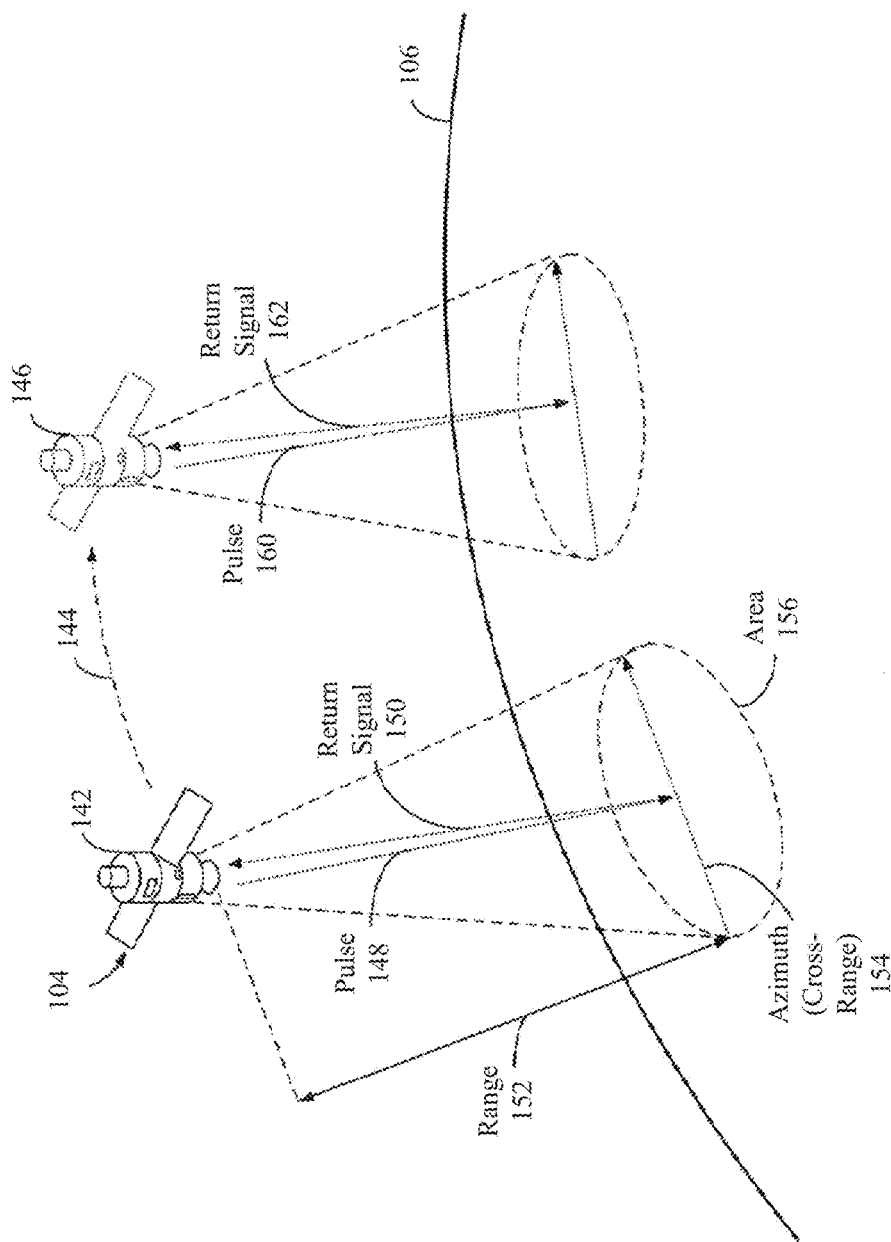
FIG. 1B is a diagram of an example of a SAR imaging system in an orbiting satellite in accordance with the present invention.

FIGS. 1A and 1B show typical examples of applications for a SAR system of two types of platforms that include aircrafts or satellites. In FIG. 1A, the platform is an aircraft 100 that is shown flying over a landmass 102. Similarly, in FIG. 1B, the platform is a satellite 104 that is shown flying over a planetary body 106.

In FIG. 1A, the aircraft 100 is shown flying a course along a flight path 108 at a constant altitude 110 with a nadir 112 directly beneath the aircraft 100. In an example of operation, a SAR system (not shown) located on the aircraft 100 radiates (i.e., transmits) SAR radar signal pulses 114 obliquely at right angles to the direction 116 of flight along the flight path 108. The SAR radar signal pulses 114 are transmitted from a SAR antenna 118 (i.e., the "real" antenna) located on the aircraft 100 that has a relatively small aperture size with a correspondingly small antenna length. As the aircraft 100 moves along the flight path 108, the SAR synthesizes a SAR synthetic antenna 120 that has a synthesized length 122 that is much longer than the length of the real antenna 118.

As the SAR radar signal pulses 114 hit the landmass 102 they illuminate an area 124 (i.e., a footprint) of the landmass 102. The illuminated area 124 corresponds to a width 126 and 128 of the main beam of the real antenna 118 in an along-track direction 130 and across-track direction 132 as it intercepts the landmass 102. In this example, the along-track direction 130 is parallel to the direction 116 of the flight path 108 of the aircraft 100 and it represents the azimuth 130 dimension for the SAR system. Similarly, the across-track direction 132 is perpendicular to the flight path 108 of the aircraft 100 and it represents the range 134 dimension of the SAR system. It is appreciated by those of ordinary skill in the art that in this example the width 128 of the main beam along the across-track direction 132 is longer than the width 126 along the azimuth 130 because the main beam of the SAR radar signal pulse 114 is being radiated at a look-down angle from the aircraft 100.

As the aircraft 100 travels along the flight path 108, the illuminated area 124 defines a swath 136, having a swath width 138, which is a strip along the surface of the landmass 102 that has been illuminated by the illuminated area 124 produced by the main beam of the real antenna 118. In this example, the length 122 of the synthetic antenna 120 is directly proportional to the range 134 in that as the range 134 increases, the length 122 of the synthetic antenna 120 increases.

Turning to FIG. 1B, an example of a SAR imaging system in an orbiting satellite 104 is shown. In this example, the satellite 104 is configured to capture SAR image data of a planetary body 106 to generate a "stripmap" SAR image of the planetary body 106. The orbiting satellite 104, as shown in FIG. 1, is orbiting from a first position 142 along a course 144 (i.e., a flight path) toward a second position 146.

In an example of operation, the orbiting satellite 104, at the first position 142, generates a pulse 148 through an antenna (not shown) and receives a returned signal 150 resulting from the pulse 148 using the same antenna. The pulse 148 is generated along a range 152 that represents a line of sight between the orbiting satellite 104 and the planetary body 106. The imaging data is collected for an azimuth (i.e., the cross-range dimension) 154 that is perpendicular to the range 152 and generally parallel with the course 144 of the orbiting satellite 104. In this example, the pulse 148 may be configured to image an area 156 surrounding the azimuth 154.

As the orbiting satellite 104 travels along the course 144, it will generate additional pulses and capture additional data. At the second position 146, for example, the orbiting satellite 104 may generate another pulse 160 that will result in an additional returned signal 162. In this manner, the orbiting satellite 104 may image a large area over which the course 144 of the orbiting satellite 104 extends over the planetary body 106. If the course 144 of the orbiting satellite 104 is not parallel with an equator of the planetary body 106, the course 144 of the orbiting satellite may eventually cause the orbiting satellite 104 to fly over an entire surface of the planetary body 106, enabling the orbiting satellite 104 to capture image data for the entire surface of the planetary body 106.

Figure 2:
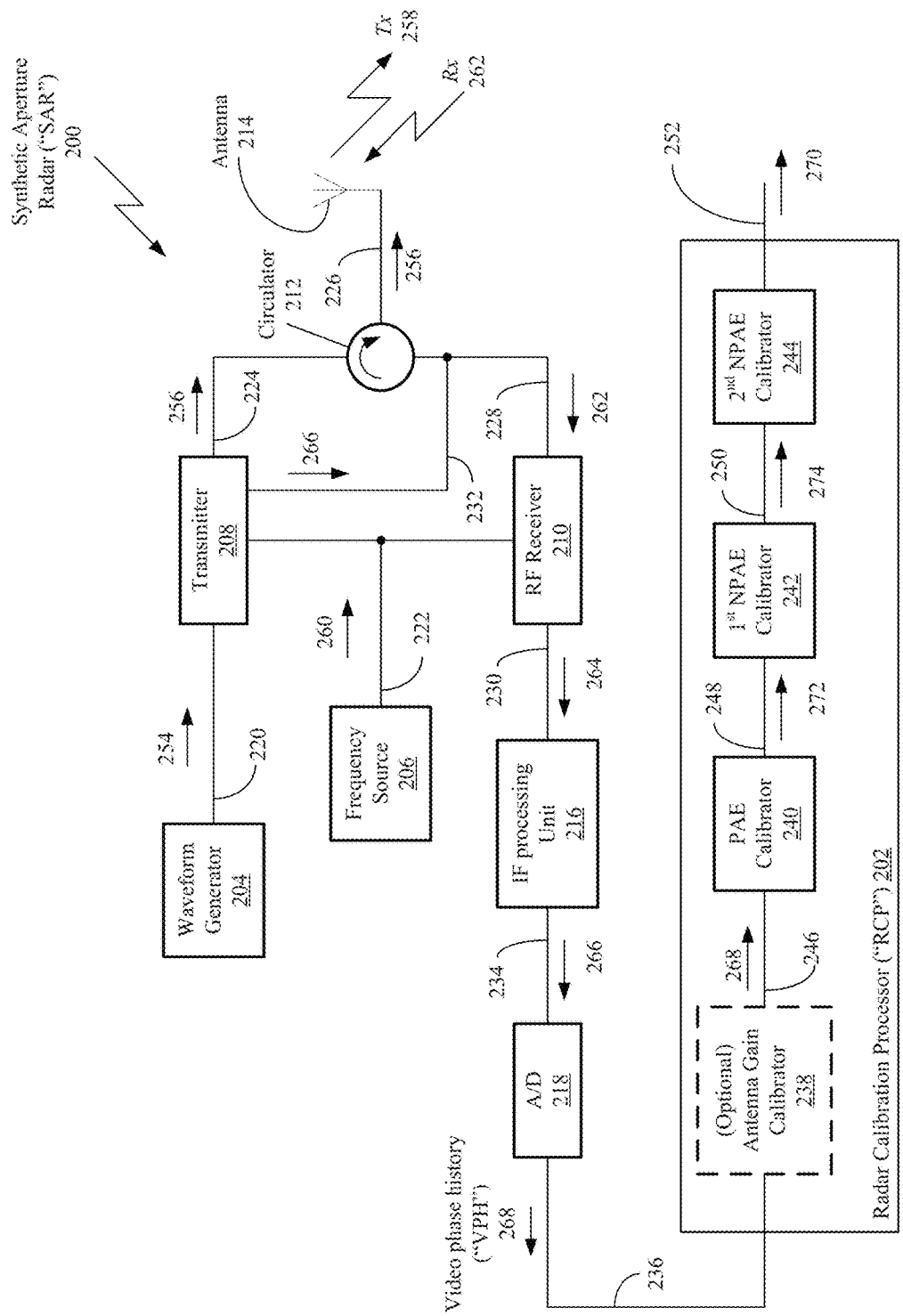
FIG. 2 is a block diagram of an example of an implementation of the SAR, of either FIG. 1A or 1B, having a radar calibration processor ("RCP") in accordance with the present invention.

In FIG. 2, a block diagram of an example of an implementation of a SAR 200 having a RCP 202 is shown in accordance with the present invention. The SAR 200 may include a waveform generator 204, frequency source 206, transmitter 208, radio frequency ("RF") receiver 210, circulator 212, antenna 214, intermediate frequency ("IF") processing unit 216, and analog-to-digital ("A/D") module 218. In this example, the waveform generator 204 is in signal communication with the transmitter 208 along signal path 220. The frequency source 206 is in signal communication with both the transmitter 208 and RF receiver 210 via signal path 222 and the circulator 212 is in signal communication with the transmitter 208, antenna 214, and RF receiver 210 via signal paths 224, 226, and 228, respectively. The RF receiver 210 is in signal communication with the IF processing unit 216 and optionally with transmitter 208 via signal paths 230 and 232, respectively. The A/D module 218 is in signal communication with the IF processing unit 216 and the RCP 202 via signal paths 234 and 236, respectively.

The RCP 202 may include an optional antenna gain calibrator 238, PAE calibrator 240, first NPAE calibrator 242, and second NPAE calibrator 244. In this example, the optional antenna gain calibrator is in signal communication with the A/D module 218 and the PAE calibrator 240 via signal paths 236 and 246, respectively. If optionally, there is no antenna gain calibrator 238, the PAE calibrator 240 would be in signal communication with the A/D module 218 via signal path 236. The first NPAE calibrator 242 is in signal communication with the PAE calibrator 240 and second NPAE calibrator 244 via signal paths 248 and 250, respectively. The second NPAE calibrator 244 may also be in signal communication with a SAR image processor (not shown) via signal path 252.

In an example, the waveform generator 204 is a device that is configured to produce pulsed waveforms that are passed to the transmitter 208 via signal path 220 for transmission. Typically, the waveform generator 204 utilizes pulse compression techniques to produce pulses for transmission that are encoded in linear frequency modulated ("FM") chirps. The FM chirped pulses are transmitted a pulse repetition frequency ("PRF"), which is the number of pulses transmitted per second. The FM chirped waveform pulses of extended duration reduce the peak transmitter power without a reduction in average power transmission. The chirp waveforms produced by the waveform generator 204 may still be too wide in bandwidth to provide sufficient range resolution for the SAR. As such, in order to further improve the range resolution of the SAR, the waveform generator 204 may produce a plurality of stepped-chirp waveform signals 254. In stepped-chirp operation, each wide bandwidth chirp waveform may be divided in to multiple sub-band chirp waveforms that have sub-bands that are steps of the wide bandwidth chirp waveform. These sub-band chirp waveforms (referred to as the stepped-chirp waveforms) may be transmitted by the transmitter 208. Once the reflected stepped-chirp signals are received by the RF receiver 210, they may be combined to synthesis a wide composite chirped signal that is similar to the original wide bandwidth chirp waveform. This wide composite chirped signal (herein also referred to as "composite chirped signal") may then be utilized to produce a high resolution SAR image.

Figure 3:
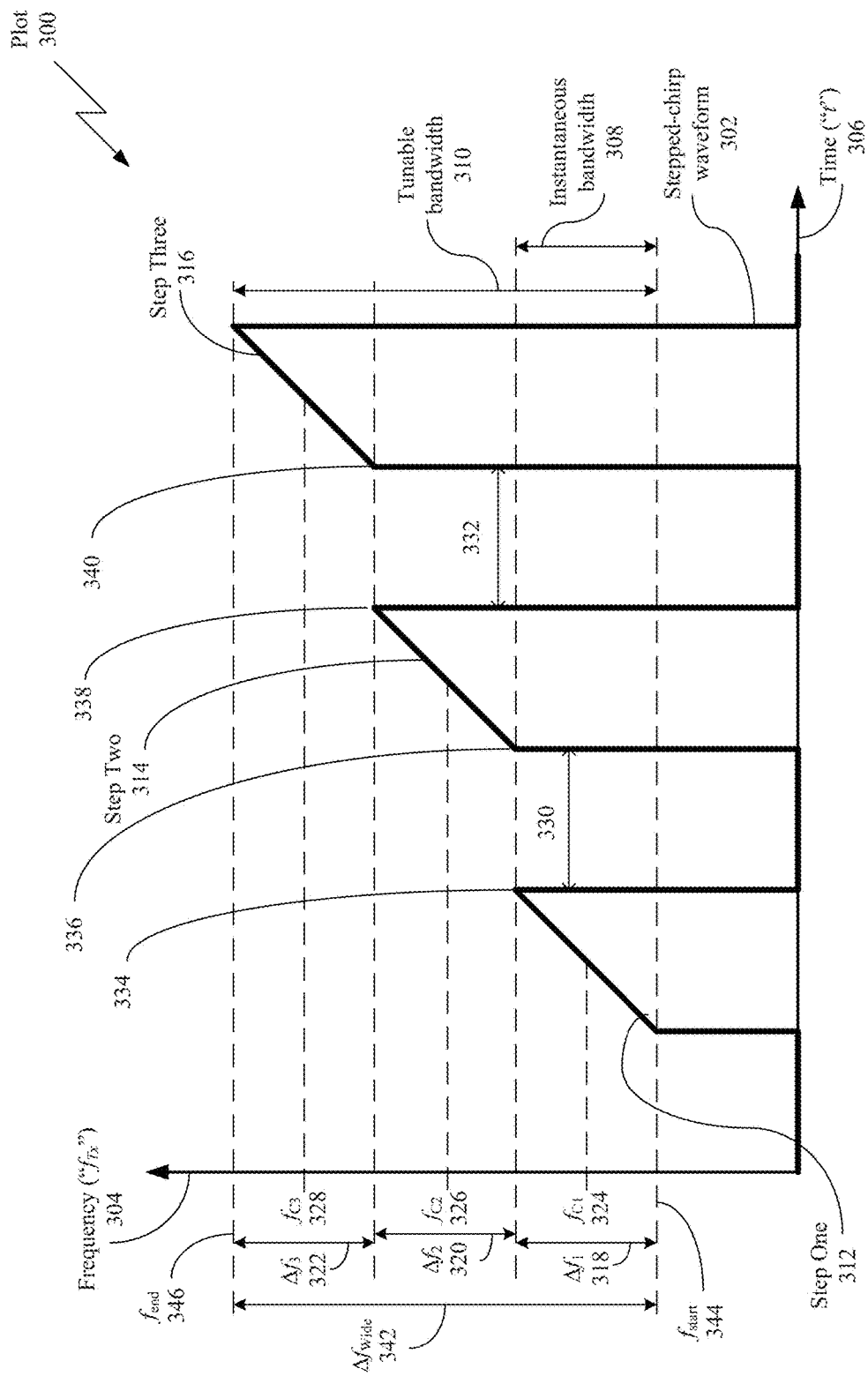
FIG. 3 is a plot of an example of an implementation of a stepped-chirp waveform in accordance with the present invention.

In FIG. 3, a plot 300 of a transmitted stepped-chirp waveform 302 is shown as a function of frequency ("$f_{Tx}$") 304 versus time ("t") 306. The transmitted stepped-chirp waveform 302 has an instantaneous bandwidth 308 and tunable bandwidth 310 as shown. Additionally, in this example the transmitted stepped-chirp waveform 302 is shown to have three steps 312, 314, and 316 having three corresponding frequency sub-bands $\Delta f_1$ 318, $\Delta f_2$ 320, and $\Delta f_3$ 322, centered around three center frequencies $f_{C1}$ 324, $f_{C2}$ 326, and $f_{C3}$ 328, respectively. The three frequencies $f_{C1}$ 324, $f_{C2}$ 326, and $f_{C3}$ 328 are spaced (i.e., stepped) apart at a constant frequency spacing. The constant frequency spacing is not related to the pulse repetition time ("PRT") of the complete chirp waveform (i.e., the complete transmitted stepped-chirp waveform 302), which is the inverse of PRF. From FIG. 3, it is appreciated that the transmitted stepped-chirp waveform 302 has two discontinuities 330 and 332 between the step boundaries 334 and 336 of steps one 312 and two 314 and the step boundaries 338 and 340 of steps two 314 and three 316, respectively. In this example, the three steps 312, 314, and 316 are steps of the wider stepped-chirped waveform signal 302 that has a wide bandwidth $\Delta f_{Wide}$ 342 starting at a first frequency ("$f_{start}$") 344 and ending at a second frequency ("$f_{end}$") 346. The $f_{start}$ 344 also corresponds to the start frequency of step one 312 and $f_{end}$ 346 corresponds to the ending frequency of step three 316. It is appreciated by those of ordinary skill in the art that only three steps are shown in this example for the convenience of illustration and that the transmitted stepped-chirp waveform 302 may include a large number of steps well beyond just three.

Turning back to FIG. 2, the waveform generator 204 may produce the stepped-chirped signals 254 that are passed to the transmitter 208. The transmitter 208 may be a standard SAR type of transmitter that modulates and amplifies the stepped-chirp signal 254 to produce a modulated stepped-chirp signal 256 that is transmitted through the circulator 212 to the antenna 314 (via signal paths 224 and 226) and radiated 258 to the target area (i.e., 124 or 156) being scanned by the SAR 200. The transmitter uses a frequency reference signal 260 to modulate the stepped-chirped signal 254. The frequency reference signal 260 is produced by the frequency source 206 and passed to the transmitter 208 via signal path 222. The frequency source 206 may be a standard known SAR type of frequency source (such as, for example, a local oscillator or frequency synthesizer) capable of producing a high fidelity and stable frequency reference signal 260.

The RF receiver 210 may be a standard type of SAR front-end receiver capable of receiving a return modulated stepped-chirp signal 262 (via the antenna 214, signal path 226, the circulator 212, and signal path 228) and preforming coherent detection of the return modulated stepped-chirp signal 262. The RF receiver 210 may perform coherent detection of the return modulated stepped-chirp signal 262 by demodulating directly to a baseband signal (i.e., a return version of the stepped-chirped signal 254 in the case of the RF receiver 210 having a direct conversion demodulator (not shown)) or down-converting the return modulated stepped-chirp signal 262 from an RF signal to a lower IF frequency (i.e., in the case of the RF receiver 210 being a super heterodyne receiver) that is easier to process by the SAR. In the case of a super heterodyne type of RF receiver 210, the RF receiver may include a RF amplifier (not shown), a frequency mixer (not shown), and a frequency filter (not shown). The RF amplifier is configured to receive the return modulated stepped-chirp signal 262, amplify it with enough gain so that it may be properly heterodyned (i.e., mixed) by the mixer, and passing the amplified return modulated stepped-chirp signal to the mixer. The mixer would then mix the amplified return modulated stepped-chirp signal with the frequency reference signal 260 to produce a lower and higher frequency versions of the amplified return modulated stepped-chirp signal plus other harmonics. In this example, the frequency filter (such as, one or more band-pass filters) would block the higher frequency version and the harmonics to produce an IF return modulated stepped-chirp signal 264 which would be passed to the IF processing unit 216 via signal path 230.

The RF receiver 210 may also optionally receive a test signal 266 of the modulated stepped-chirp signal 256 via signal path 232, which bypasses both the circulator 212 and antenna 214. In this example, the transmitter 208 may include a loopback test switch (not shown) that allows a test signal 266 of the modulated stepped-chirp signal 256 to be passed via signal path 232 instead of signal path 224.

It is appreciated by those or ordinary skill in the art that the return modulated stepped-chirp signal 262 is only a portion of a reflected signal (not shown) produced by back scatter (i.e., an echo of a portion) of the transmitted 258 modulated stepped-chirp signal 256. As such, the return modulated stepped-chirp signal 262 is a typically a low power echo version of the modulated stepped-chirp signal 256 that includes (among others) Doppler, amplitude, and phase errors.

In this example, the IF processing unit 216 may be a component, module, or device capable of receiving the IF return modulated stepped-chirp signal 264, amplifying, and filtering the IF return modulated stepped-chirp signal 264 so that a detector may convert the IF pulses into image pulses that may be utilized to form the SAR image of the target area scanned by the SAR 200. Optionally, the IF processing unit 216 may be in signal communication with the frequency source 206 and/or the waveform generator 204 so as to receive the frequency reference signal 260 and/or the stepped-chirp signal 254. The IF processing unit 216 may be a hardware device, software module, or both, running on a processor (not shown), application specific integrated circuit ("ASIC"), field-programmable gate array ("FPGA"), or digital signal processor ("DSP"). The resulting processed IF signal data 266 is passed to the A/D module 218.

The A/D module 218 receives the IF signal data 266 and converts it to a digital data 268 that represents a video phase history ("VPH") of the IF signal data 266. The resulting VPH data 268 is then passed to the RCP 202 via signal path 236. The VPH data 268 may be the data of a composite signal of received stepped-chirp signals. It is appreciated that that the A/D module 218 and IF processing unit 216 may be combined into a single device, component, and/or module.

In this example, the frequency dependent antenna gain may need to be compensated because the antenna gain changes with frequency as well as location (i.e., the angle to the target area). It is appreciated that known techniques may be utilized in compensating for the frequency dependent antenna gain.

The RCP 202 receives the VPH data 268 and estimates the periodic and non-periodic amplitude errors and calibrates the VPH data 268 appropriately to produce amplitude corrected VPH data 270 that may be passed to other SAR imaging systems (not shown) via signal path 252. The RCP 202 may also optionally compensate the frequency dependent antenna gain with optional antenna gain calibrator 238.

The VPH data 268 includes time, frequency, and phase information that is indicative of range and azimuth (i.e., cross-range) information. Specifically, the SAR utilizes time and frequency information to determine the range values of the target area scanned by the SAR and utilizes the phase difference between successive samples to determine the azimuth values of the target area.

In determining the VPH data 268, the A/D module 218, IF processing unit 216, or both, may also include a hardware and/or software module that is capable of producing the VPH data 268. In general, the VPH data 268 is three dimensional raw SAR data for range, azimuth, and elevation of target data from the target area being scanned. Generally, this raw data is collected in a polar coordinate format that needs to be converted to rectangular coordinate format before image processing may be performed. If the raw data is thought of as described by as a range vector $k_R$ that has an elevation angle and azimuth angle, it may be converted to a rectangular format of $k_x$, $k_y$, and $k_z$ (utilizing a polar format algorithm ("PFA")) that represents the rectangular coordinate projections of the $k_R$ range vector. In this example, the $k_x$ represents the index number of the pulse of the return signal (i.e., the range) and $k_y$ represents the spatial frequency (i.e., range samples in each pulse return) of the return signal.

The RCP 202 receives the VPH data 268 and first preforms a PAE calibration with the PAE calibrator 240 to produce PAE calibrated data 272 that is passed to the first NPAE calibrator 242. The first NPAE calibrator 242 (also referred to herein as the NPAE-1 calibrator) performs an NPAE calibration for type-1 non-periodic amplitude errors ("NPAE-1") and produces NPAE-1 calibrated data 274 that is passed to the second NPAE calibrator 244. The second NPAE calibrator 244 (also referred to herein as the NPAE-1 calibrator) performs an NPAE calibration for type-2 non-periodic amplitude errors ("NPAE-2") and produces NPAE-2 calibrated data that corresponds to the amplitude corrected VPH data 270. The RCP 202 performs a combined method that first estimates the PAE that is common in all three types of amplitude errors (i.e., PAE, NPAE-1, and NPAE-2) and then estimates the NPAE-1 and NPAE-2 errors that vary between the steps of the chirp waveform contained in the VPH data 268. The methods performed by the RCP 202 are parametric approaches that set the error models utilizing Legendre polynomials and then determine the coefficients of the polynomial models that lead to best image quality. Generally, the approach is based on the fact that image quality is improved when amplitude error is reduced.

In an example of operation, the PAE calibration includes performing a search for the coefficients of an error model that is common to all the steps in the VPH data 268 (which is the data from the composite signal of all the steps of the stepped-chirp signals) by applying the same error correction to all the steps in the VPH data 268 to determine the best quality of the image formed from the VPH data 268.

The NPAE-1 calibration includes performing a search for the coefficients of another error model for all the steps in the PAE calibrated data 272 to determine the best quality image formed from the PAE calibrated data 272. The NPAE-1 calibration then produces the NPAE-1 calibrated data 274. Since the $0^{th}$ order (which is a constant value) amplitude error does not affect the image quality within each step, this error model may start from order one (i.e., $1^{st}$ order). In this example, the model of the amplitude error is based on the Legendre polynomials with coefficients that are to be determined for the best image quality when the amplitude error is corrected.

The NPAE-2 calibration takes the NPAE-1 calibrated data 274 and searches for the coefficients of a third error model for all the steps in the NPAE-1 calibrated data 274 to determine the best quality image formed from the NPAE-1 calibrated data 274.

The NPAE-2 calibration process includes estimates the discontinuities between the steps after NPAE-1 calibration. The process takes a pair of consecutive steps and estimates a discontinuity between two steps by searching for the amount of discontinuity that leads to an optimum image quality metric ("IQM") when compensated. Starting with the first two steps, the process multiplies a scalar to the data in the second step and searches for the coefficient of the $0^{th}$ order term that leads to the best image quality with the optimum weights from the concatenated data of two steps with the amplitude adjusted second step. The composite signal of two steps has the same amplitude as the first step without an amplitude discontinuity at the step boundary since it is the condition for the optimum IQM with weights from the composite signal by concatenating the amplitude-adjusted second step to the first step. Next, the process take the updated data of the second step with the amplitude adjustment and the new data from the third step and performs the same process to align the $0^{th}$ order amplitude of the third step to that of the updated second step. This process is repeated up to the last step to get all steps (of the NPAE-1 calibrated data 274) with the same constant amplitude after adjustment. Since the constant amplitude from the second step is adjusted to align to that of the firm step, the final constant amplitude is that of the first step. To avoid the potential amplitude offset that comes from the first step, amplitude adjustments in all steps may be utilized for a global correction of the constant amplitude after NPAE-2 calibration. The resulting amplitude corrected VPH data 270 is then output from the NPAE-2 calibrator 244.

Amplitude Error Model and Image Quality Metrics

The Legendre polynomial is widely used to decompose a signal for its orthogonal property between different order terms on the interval $-1 \le x \le 1$. It can be generated recursively as the following.

$$P_0(x) = 1,$$

$$P_1(x) = x$$

$$P_n(x) = \frac{(2n-1)xP_{n-1}(x) - (n-1)P_{n-2}(x)}{n} \text{ for } n \ge 2.$$

Using this approach, an amplitude error $\Delta A(k)$ may be normalized by the expression $A(x)=1+\Delta A(k)$ and can be modeled using Legendre polynomials of order N as $$\Delta A(x) = \sum_{n=0}^{N} a_n P_n(x) \text{ for } -1 \le x \le 1.$$

In general, the image quality is best when there is no amplitude error. As an example, low-order amplitude errors cause point target image degradations around the target image main-lobe and as the order of the amplitude errors increase the image degradation generally moves toward the farther sidelobe regions. Additionally, periodic amplitude errors create paired echoes in the image.

In general, the image quality is better when the image looks sharper and the image contrast is greater. Additionally, uncertainty in the image decreases when the image gets sharper and the image contrast increases.

Based on these properties, entropy may be utilized as an IQM in analyzing the VPH data 268 for amplitude errors. Entropy is a known metric for uncertainty measure that has been utilized in the area of communication theory. It is defined as follows $$M_E = -\sum_{i,j} Y(i,j) \log Y(i,j) \text{ where} \quad \text{(Equation \#1)}$$

$$Y(i, j) = \frac{|z(i, j)|^2}{\sum_{i,j} |z(i, j)|^2}$$

for an image pixel z(i, j) at position (i, j). It is an IQM that may be minimized. Another IQM that may be utilized is the negated 4-norm function defined as follows $$M_4 = \frac{-1}{I \cdot J} \sum_i \sum_j \left| \frac{z(i, j)}{\bar{z}(i)} \right|^4 \text{ where} \qquad \text{(Equation \#2)}$$

$$\bar{z}(i) = \sqrt{\frac{1}{J} \sum_j |z(i, j)|^2}$$

for image pixel z(i, j) at position (i,j).

These two IQM functions may be utilized for searching for the coefficients of the amplitude error models described above in the PAE, NPAE-1, and NPAE-2 calibrations. The amplitude error models are modeled utilizing the Legendre polynomials and using an optimization function to minimize one of the two IQMs with the proper setting for the error application and image formation. The Broyden-Fletcher-Goldfarb-Shanno ("BFGS") algorithm may be utilized as an optimization function because it is a known iterative method for solving unconstrained nonlinear optimization problems. In general, the term optimization includes finding "best available" values of some objective function (i.e., in this case an IQM) given a defined domain (or a set of constraints) that may include a variety of different types of objective functions and different types of domains.

In this example, since the low-order amplitude error is generally dominant in each step, degradation due to amplitude errors occur near the main-lobe of the VPH data 268. As such, the 4-norm function IQM will perform better because it puts greater weights on the image pixels in the VPH data 268 that have higher intensities.

Optimum Amplitude Weights

Unlike a phase error correction as described in the related application titled "PHASE CALIBRATION OF A STEPPED-CHIRP SIGNAL FOR A SYNTHETIC APERTURE RADAR," the correction of the amplitude error in each step does not lead to an optimum IQM if the optimum weights are not used in NPAE calibration. For amplitude errors, the optimum IQM may be reached only when the appropriate weights are applied. In this example method, the process takes a direct and efficient approach of applying the optimum weights in the dispersed domain prior to conversion to an image. The optimum weights from polynomial model are obtained using an optimization routine for the selected objective function. The weights are expressed using the Legendre polynomials as $$W(x) = \sum_{n=0}^{N} a_{2n} P_{2n}(x) - 1 \le x \le 1.$$

It is noted that in this example there are no odd-order terms in the weights expression. For 4-norm IQM (i.e., $M_4$ described by equation \#2), the weight function modeled by the even-order (i.e., $4^{th}$ order) Legendre polynomials of order four is generally considered appropriate. As such, the coefficients of the polynomials of order four for negated 4-norm IQM are as follows:

$a_0 = 0.9510$; $a_2 = -0.5878$; and $a_4 = 0.0318$.

Similarly, the optimum weights for the entropy (i.e., $M_E$ described by equation \#1) produce generally good results using $4^{th}$ order polynomial with the coefficients obtained as follows:

$a_0 = 2.3574$; $a_2 = -1.5779$; and $a_4 = 0.0381$.

Although one of these two optimum weights may be utilized to estimate the amplitude error in all three of the stages of calibration (i.e., PAE, NPAE-1, and NPAE-2 calibrations), entropy is generally preferable for the PAE and NPAE-2 calibration because entropy is more sensitive to changes in low intensity image data compared to 4-norm. As such, the optimum weights for entropy are preferable for the first and third stages of calibration (i.e., PAE and NPAE-2 calibrations). The non-periodic amplitude error in each step may be estimated in the second stage (i.e., the NPAE-1 calibration) utilizing only the single step data in each step when point-like targets are well spaced. In this case, the 4-norm and corresponding optimum weights is preferable in the NPAE-1 calibration. However, it is noted, that when the targets are not well spaced and the interferences between targets become severe, using the data in each step only does not produce acceptable results. In this case, it is preferable to apply the optimum weights for entropy to composite data from all steps during the optimization process for the estimation of the non-periodic error in each step. Using wideband data by concatenating all the steps helps reducing the target interference due to enhanced resolution as well as improving the signal-to-noise ratio ("SNR").

Input Data for the Calibration of Amplitude

There are two types of input data that can be considered for the estimation of the amplitude error in a stepped-chirp signal. The first one is the internally generated loopback signal (i.e., test signal 266) by bypassing antenna 214 and circulator 212. The internally generated loopback signal is a high fidelity signal with a very high SNR that has not been radiated and received by antenna 214. However, since the antenna 214 has been bypassed, it does not include the phase error and/or amplitude error contributions from antenna 214. The RCP 202 may be configured to produce a separate estimation of periodic and non-periodic amplitude error components from the measured loopback signal 266.

The second type of input data is the return signal (i.e., the return modulated stepped-chirp signal 262) of the transmitted stepped-chirp pulses (i.e., the modulated stepped-chirp signal 256). As discussed earlier, since the amplitude and phase of the antenna gain changes with frequency as well as location (angle), proper compensation of antenna gain may be required. The compensation may be performed by the optional antenna gain calibrator 238. In this example, the amplitude calibration is performed on the data after compensating for the spatially and spectrally variant antenna gain.

As discussed earlier, since the collected chirp pulses are laid out in a radial direction in the spatial-frequency domain for polar format processing (i.e., a range vector $k_R$ that has an elevation angle and azimuth angle), the step boundaries are curved. Additionally, for image formation, the collected data needs to be interpolated as data samples on a rectangular grid (i.e., $k_x$, $k_y$ for a two-dimensional image). Unfortunately, this results in the step boundaries in the range frequency not being lined up when inverse processing is performed on the azimuth-compressed data from the gain-compensated image. However, since the crossing of the step boundaries is usually not that large, the step-to-step amplitude error and amplitude error may be estimated (approximately) from the gain-compensated data utilizing the present described calibration methods and this correction may be performed on the same data set.

If the curvature of the step boundary is not negligibly small (in the case of large SAR collection angle and bandwidth for ultra-high resolution), a limited portion of the collected pulses around the mid-array point may be utilized for the estimation of the amplitude error and amplitude error with accurate step boundaries.

Estimation of the Amplitude Error

As discussed earlier, the amplitude error of the stepped-chirp signal may be separated into periodic and non-periodic components, which have already been denoted as PAE and NPAE, respectively. The PAE is the repeatable amplitude error that is common to all steps due mainly to the hardware characteristics in the IF signal path. NPAE is the amplitude error that unique in each step and that is mainly caused by the hardware in the RF signal path. The IF signal path is the post mixing signal path, where the mixer (not shown) would be an RF mixer located in the RF receiver 210.

Figure 4:
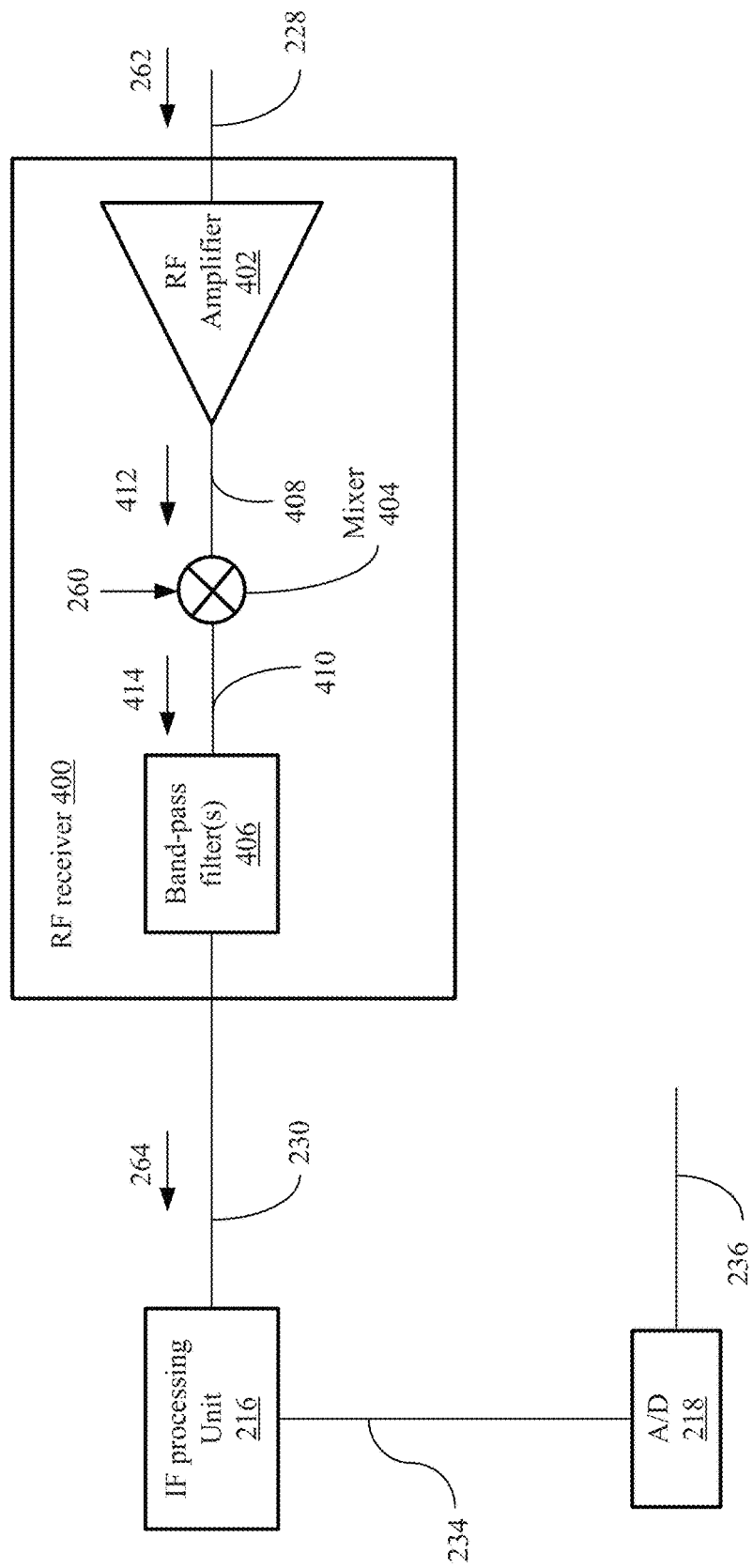
FIG. 4 is a block diagram of an example of an implementation of the radio frequency ("RF") receiver, of FIG. 2, in accordance with the present invention.

In FIG. 4, a block diagram of an example of an implementation of an RF receiver 400 is shown in accordance with the present invention. The RF receiver 400 is an example of an implementation of the RF receiver 210 shown in FIG. 2 and as such is in signal communication with the circulator 212 and IF processing unit 216 via signal paths 228 and 230, respectively. The RF receiver 400 may include an RF amplifier 402, RF mixer 404, and one or more band-pass filters 406. In this example, the RF mixer 404 is in signal communication with both the RF amplifier 402 and band-pass filter(s) via signal paths 408 and 410, respectively.

In an example of operation, as described earlier, the RF amplifier 402 receives the return modulated stepped-chirp signal 262 and amplifies it to produce an amplified return modulated stepped-chirp signal 412 that is passed to the RF mixer 404. The RF mixer 404 mixes the amplified return modulated stepped-chirp signal 412 with the frequency reference signal 260, from the frequency source 206, to produce the lower and higher frequency versions 414 of the amplified return modulated stepped-chirp signal 412 plus other harmonics. The band-pass filter(s) 406 then receive the mixed signal 414 and block the higher frequency version and the harmonics to produce the IF return modulated stepped-chirp signal 264 which is passed to the IF processing unit 216 via signal path 230.

In this example, the IF signal path would start at signal path 414 (i.e., post the RF mixer 404) and would continue until signal path 236 into the RCP 202. In addition to amplitude error caused by the common hardware in the IF signal path, there may also be a common amplitude error that contributes to the PAE that occurs in the RF signal path (i.e., before the RF mixer 404 that includes the signal path from the antenna 214 to signal path 408 after the RF amplifier 402) but is independent from the RF bandwidth. Again, as mention earlier, the NPAE is the amplitude error that is unique in each step and is mainly caused by the hardware in the RF signal path.

Figure 5:
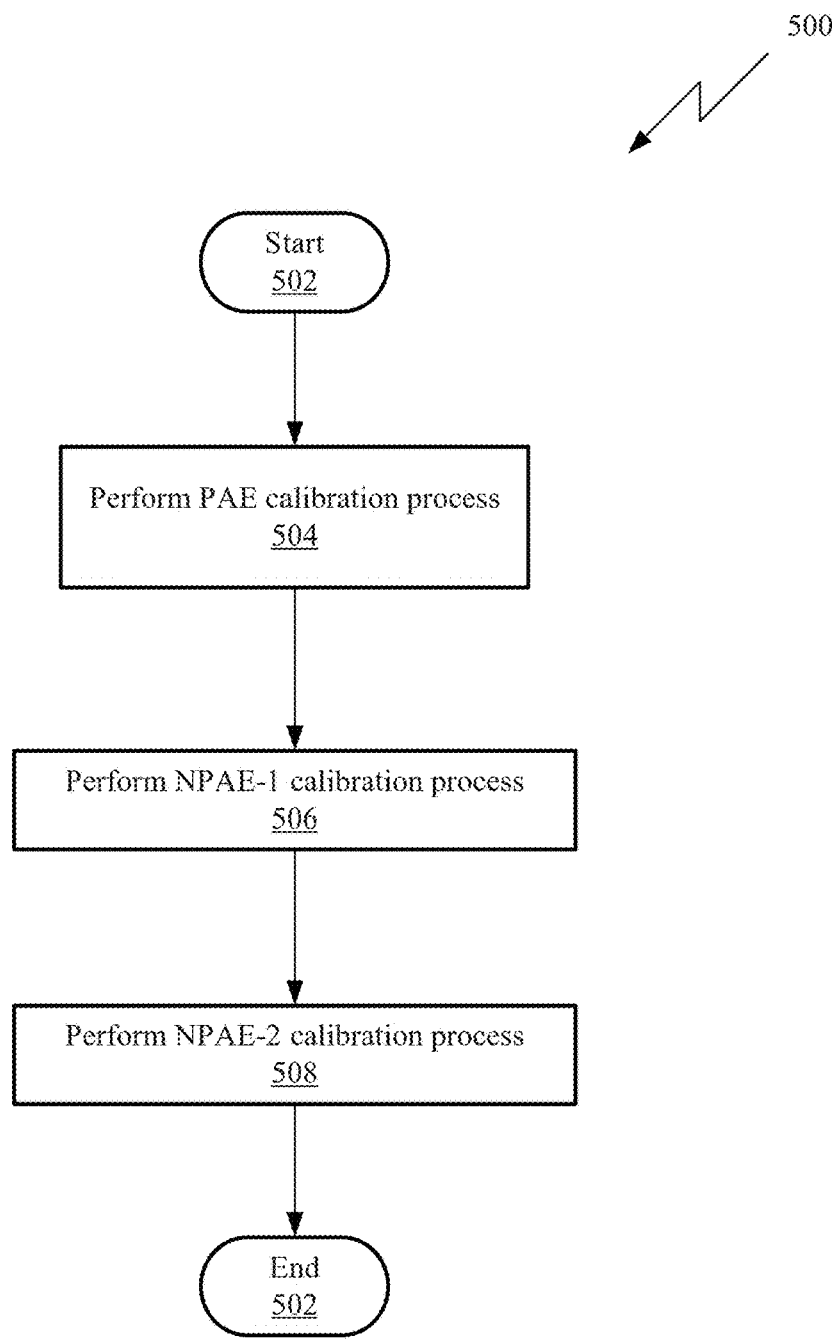
FIG. 5 is a flowchart of an example of an implementation of the method performed by the RCP in determining the amplitude error in accordance with the present invention.

In FIG. 5, a flowchart 500 is shown of an example of an implementation of the method performed by the RCP 202 in determining the amplitude error. The flowchart 500 shows that the method has three sub-methods (or calibration stages) that are performed sequentially. Specifically, the process starts 502 and the first sub-method 504 performed is the PAE calibration process 504. The process then continues to the second sub-method 506 and performs the NPAE-1 calibration process 506. The process then proceeds to the third sub-method 508 and performs the NPAE-2 calibration process 508. The process then ends 510.

Turning to the NPAE, as mentioned earlier, the NPAE is the amplitude error that is unique in each step. It is mainly caused by the hardware in the RF signal path. Since the PAE and NPAE are mixed in range-frequency data, the amplitude error may be estimated and compensated in a selected central data block of the VPH data 268 in a sequential manner for VPH data 268 of real collection data from the return modulated stepped-chirp signal 262 or in whole collected pulses in a sequential manner for the input type 2 amplitude errors from the real collection. In this example, the range frequency is the dimension converted from the range in the spatial domain, which is done by taking an inverse Fourier transform of the VPH data 268 in a matched filter approach. The azimuth compressed data may be expressed with two amplitude components for the range frequency index ("k") in step "m." In this example, m represents the index of the total number of steps "M" in the chirped signal.

Omitting the azimuth index for simplicity, the normalized total amplitude with PAE and NPAE applied successively may be expressed by $$A_m(k)=[1+\Delta A^{PAE}(k)]\cdot[1+\Delta A_m^{NPAE}(k)].$$

Then, total amplitude error can be expressed from two decomposed errors as $$\Delta A_m(k)=\Delta A^{PAE}(k)+\Delta A_m^{NPAE}(k)+\Delta A^{PAE}(k)\cdot\Delta A_m^{NPAE}(k).$$

In this example, the separation of the amplitude error into periodic and non-periodic components may be useful to understand and diagnose error contributions through RF and IF paths.

PAE Calibration

The PAE calibration is the first stage of calibration. In the PAE calibration process, the PAE is estimated by searching for the coefficients of the common amplitude error model that leads to a minimum IQM of the formed image from the composite signal when the calculated common amplitude error from the error model is compensated in the range-frequency domain for each step. The search for the optimum coefficients of the amplitude error model may be accomplished utilizing, for example, the efficient multidimensional optimization method of the BFGS.

The PAE, which is common for all of the steps, is expressed using the Legendre polynomials starting from order one to order $O_{pae}$ as follows $$\Delta A_m^{PAE}(\hat{k}) = \Delta A^{PAE}(\hat{k}) = \sum_{i=1}^{O_{pae}} a_i P_i(\hat{k})$$

All the polynomial terms that affect the quality of the image formed from the composite signal may be included as shown in this expression starting from order one. In this expression, the "$O_{pae}$" term is the maximum order of the polynomials that can be set to a reasonable number based on an anticipated amplitude error profile—for example, the $O_{pae}$ may have a value equal to 5. In this analysis it is noted that the maximum order of the amplitude error than may be estimated in a composite signal is approximately M times $O_{pae}$ since the estimated periodic amplitude error is repeated through all steps.

For the orthogonality of the Legendre polynomial, the range of the index k value is limited to $-1 \le \hat{k} \le 1$. To align the collected data to the amplitude value to be applied using Legendre polynomial, the conventional indices of range frequency samples denoted by "k" are mapped to $\hat{k}$ by the expression $$\hat{k} = \frac{2}{K-1} \cdot \left(k - \frac{K-1}{2}\right) \text{ for } k = 0, 1, \ldots, K-1.$$

In this expression, K represents the total number of range frequency samples that is mapped to $\hat{k}$ such that k is equal to 0 and K−1 maps to $\hat{k}$=−1 and 1, respectively, because the Legendre polynomials are orthogonal in this range. From these expressions, it is noted that paired echoes appear when the PAE is not fully compensated since it is periodic. Therefore, it is necessary to use an IQM that is sensitive to the intensity changes of the paired echoes. For this example method, both $M_E$ (described by equation #1) and $M_4$ (described by equation #2) are acceptable with comparable performances. Using typical weights such as Han (also known as Hanning) or Taylor windowing (i.e., using a window function) prior to a fast Fourier transform ("FFT") produces good results.

Figure 6:
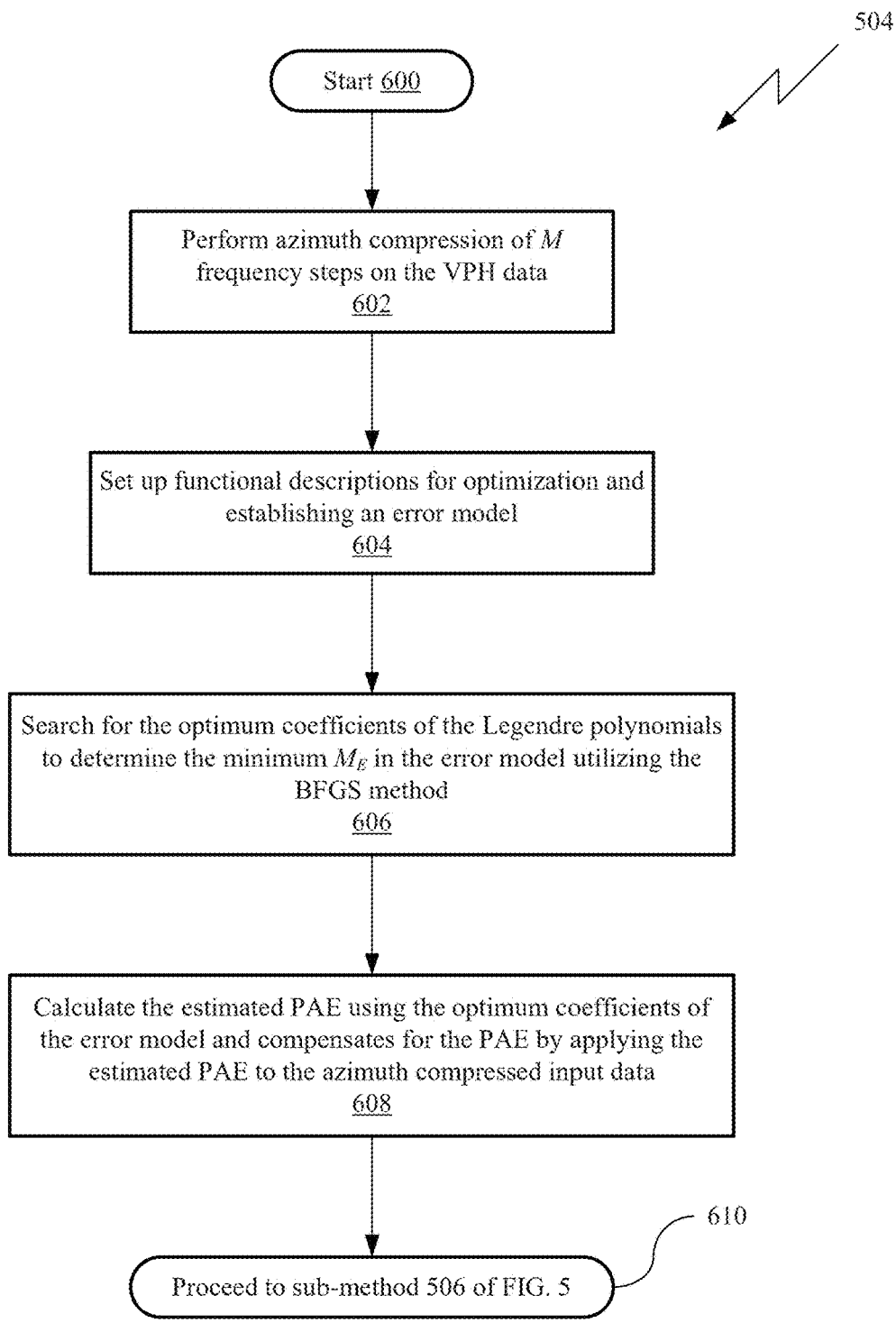
FIG. 6 is a flowchart of an example of implementation of the sub-method for preforming the PAE calibration shown in FIG. 5 in accordance with the present invention.

As discussed earlier, the first sub-method (the PAE calibration 504 in FIG. 5) of the method performed by the RCP in determining the amplitude error is described in FIG. 6. In FIG. 6, a flowchart of an example of implementation of the sub-method for preforming the PAE calibration 504 is shown in accordance with the present invention. The process starts 600 by performing an azimuth compression of M frequency steps on the VPH data in step 602. Then functional descriptions are set up (i.e., defined) for optimization and an error model is established in step 604. This step may include multiple sub-steps that will be described in FIG. 7. The process, in step 606, then searches for the optimum coefficients of the Legendre polynomials to determine the minimum entropy $M_E$ in the error model utilizing the BFGS method. Then, in step 608, the process calculates the estimated PAE using the optimum coefficients of the error model and compensates for the PAE by applying the estimated PAE to the azimuth compressed input data. The process then proceeds to the second sub-method of NPAE-1 calibration in step 610. The amplitude-compensated data after the PAE processing in sub-method 504 is used as the input for NPAE-1 processing in NPAE-1 calibration of step 610.

Figure 7:
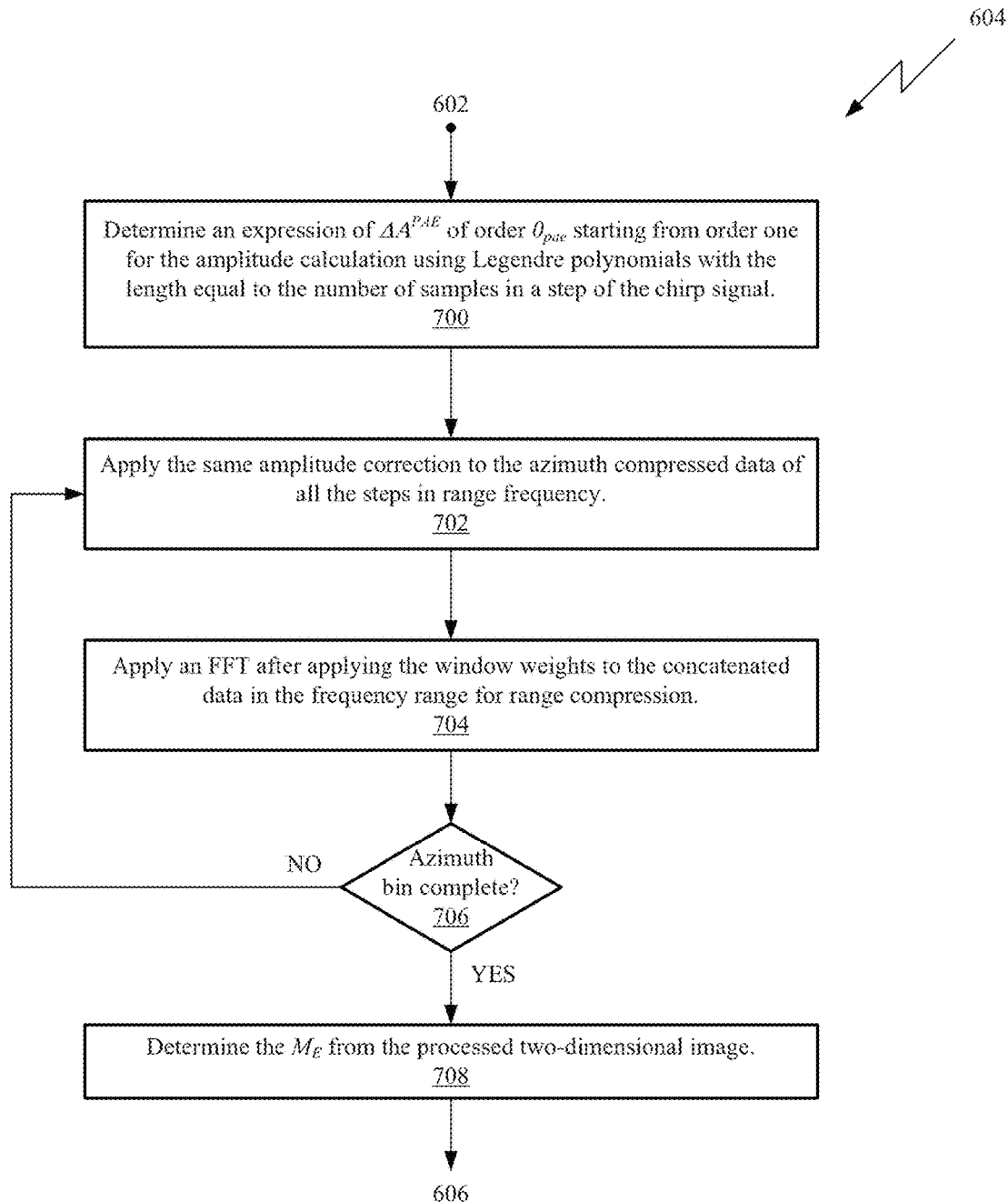
FIG. 7 is a flowchart of an example of an implementation of the sub-process for setting up the functional descriptions shown in FIG. 6 in accordance with the present invention.

In FIG. 7, a flowchart of an example of an implementation of the sub-process for setting up the functional descriptions of step 604 is shown in accordance with the present invention. The process receives the azimuth compressed data from step 602 and, in step 700, determines an expression of $\Delta A^{PAE}$ of order $O_{pae}$ starting from order one for the amplitude calculation using Legendre polynomials with the length equal to the number of samples in a step of the chirp signal. The process, in step 702, then applies the same correction amplitude to the azimuth compressed data of all the steps in the range frequency. The process, in step 704, then applies an FFT after applying the window weights to the concatenated data in the range frequency for range compression. The process then determines (in decision step 706) if all the image azimuth pixels (generally known as "azimuth bins") have been processed, if not the process repeats steps 702 and 704 until all the azimuth bins have been processed. If all the image azimuth pixels have been processed, the process, in step 708, then determines the IQM from the processed two-dimensional image, where the IQM is $M_E$ (described by equation #1). The information is then passed to step 606 which searches for the optimum coefficients of the Legendre polynomials to determine the minimum IQM in the error model utilizing the BFGS method.

Figure 8:
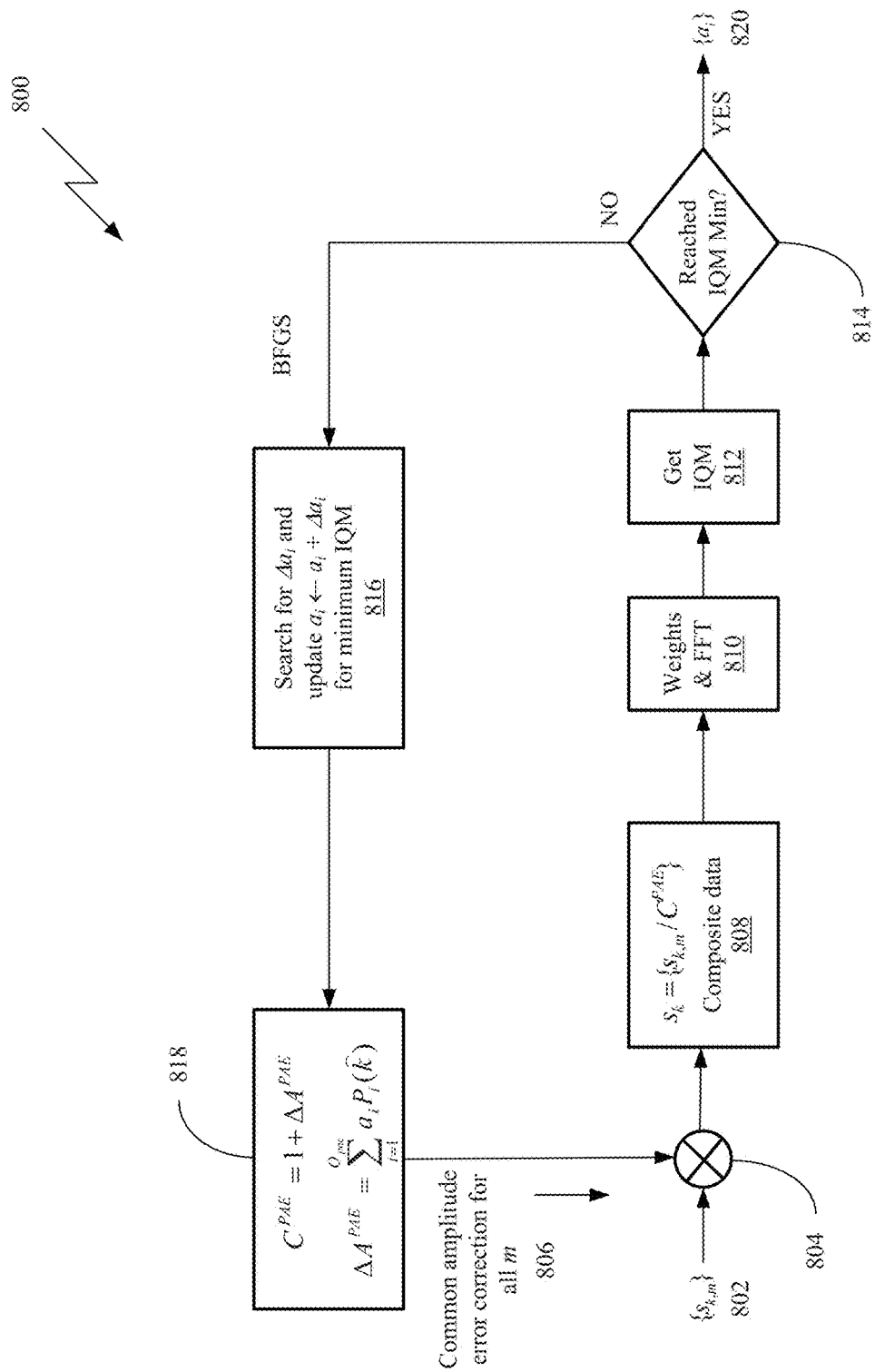
FIG. 8 is a functional flow diagram describing the process described in FIGS. 6 and 7 for the estimation of the periodic amplitude error ("PAE") in accordance with the present invention.

Turning to FIG. 8, a functional flow diagram 800 is shown further describing the process described earlier by the flowcharts shown in FIGS. 6 and 7 for the estimation of the PAE in accordance with the present invention. In this example, the azimuth compressed data $\{s_{k,m}\}$ 802 is multiplied 804 by a PAE common error correction value ("$C^{PAE}$") 806 for all m and concatenated into the composite data $s_k = \{s_{k,m}/C^{PAE}\}$ 808. Initially, the value of $C^{PAE}$ 806 is equal to 1. Window weights are applied to the concatenated data of the composite signal in the frequency range and an FFT is applied (in functional block 810). The process then determines the IQM from the processed two-dimensional image, where the IQM is entropy $M_E$ (described by equation #1) in functional block 812. If the minimum $M_E$ is not reached (in decision block 814), the process searches (in function block 816) for the optimum coefficients of the Legendre polynomials to determine the minimum $M_E$ in the error model utilizing the BFGS method. Specifically, the process searches for difference values of the coefficients ("$\Delta a_i$") and updates the coefficients ("$a_i$") by applying the difference values to the earlier coefficient, i.e., $a_i = a_i + \Delta a_i$. The updated coefficients are utilized, in functional block 818, to determine the PAE amplitude error per the earlier described expression $$\Delta A^{PPE} = \sum_{i=1}^{O_{pae}} a_i P_i(\hat{k}).$$

The $C^{PAE}$ is then updated by the relationship $C^{PAE} = 1 + \Delta A^{PAE}$ and the new $C^{PAE}$ 806 is multiplied 804 against the azimuth compressed data $\{s_{k,m}\}$ 802 and functional flow process repeats until the minimum $M_E$ is reached (in decision block 814), the process then produces the optimized coefficient values $\{a_i\}$ 820.

NPAE Calibration

The NPAE calibration is the second and third stage of calibration. The estimation of NPAE is divided into two stages because the way they affect the image is different and hence needs to be estimated in two separate stages.

1. NPAE-1 Calibration

The NPAE-1 calibration is the first part of NPAE processing for the error orders one and higher that affect the IQM of the image in each step. Since the constant amplitude errors of the $0^{th}$ order do not degrade the image quality in each step within the chirp signal, they cannot be estimated by optimizing the IQM of the image in each step. As such, they will be handled in the next stage, i.e., the NPAE-2 processing stage.

Similar to the model for PAE, the non-periodic amplitude error model utilized for NPAE-1 is expressed by (starting from order 1)

$$\Delta A_m^{NPPE-1}(\hat{k}) = \sum_{i=1}^{O_{npae}} a_i P_i(\hat{k}).$$

The amplitude errors vary between steps in the chirp signal as indicated by the subscript m in above expression and the lowest order of the Legendre polynomial that is equal to 1. Additionally, $O_{npae}$ is the maximum order of the polynomials that may be set to a reasonable number based on the anticipated amplitude error profile. In this example $O_{npae}$ may be set to a value equal to 5. It is noted that compared to the related application titled "PHASE CALIBRATION OF A STEPPED-CHIRP SIGNAL FOR A SYNTHETIC APERTURE RADAR," there are two main differences compared to the estimation of the non-periodic phase error.

The first one is the minimum order that affects IQM. In general, linear (first-order) phase error causes an image shift with no effect on the IQM; however, linear amplitude error affects the IQM. Therefore, unlike the phase error model, the amplitude error model starts from order one. The second difference is the usage of optimum weights for the estimation of amplitude error as discussed earlier in the optimum amplitude weights section.

In this approach, when sufficiently spaced point-like targets are utilized to estimate the amplitude error in each step, using the data in each step only with optimum weights for 4-norm (i.e., $M_4$) generally produces good results because the low-order amplitude error mainly affects the image near the mainlobe. However, if interferences between targets are not negligible, the composite data from all steps needs to be used during the search process for the amplitude error estimation in each step. In this case, entropy $M_E$ is used as an objective function and corresponding optimum weights need to be applied to the composite data during the optimization process.

Figure 9:
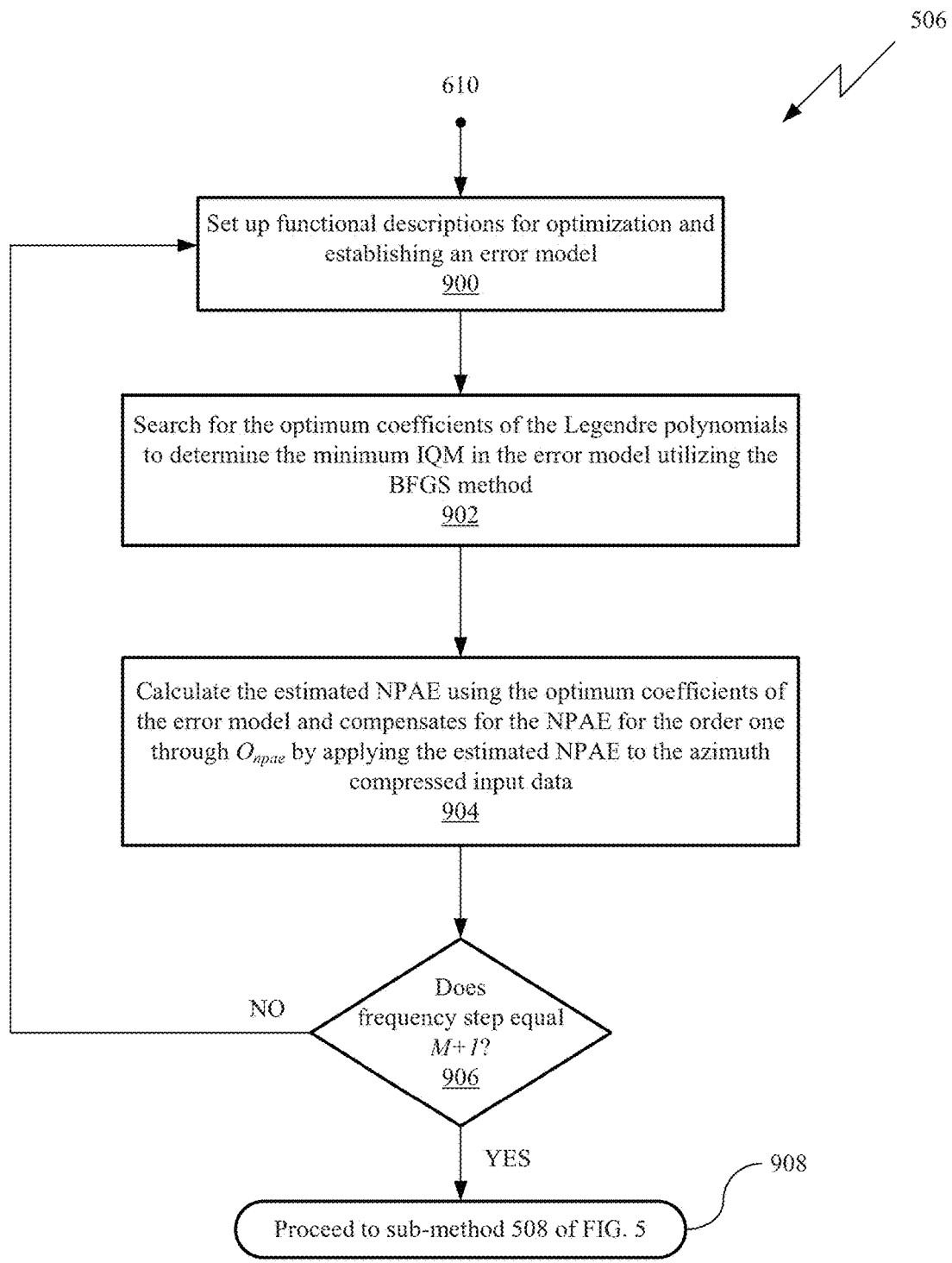
FIG. 9 is a flowchart of an example of implementation of the sub-method for preforming the NPAE-1 calibration shown in FIG. 5 in accordance with the present invention.

As discussed earlier, the second sub-method (the NPAE-1 calibration 506 in FIG. 5) of the method performed by the RCP in determining the amplitude error is described in FIG. 9. In FIG. 9, a flowchart of an example of implementation of the sub-method for preforming the NPAE-1 calibration 506 is shown in accordance with the present invention. The process starts 610 by receiving the PAE corrected data for M frequency steps after PAE processing (as was described in FIG. 6). In this example, the dimensions of the PAE corrected data are azimuth bins and range frequency. Then functional descriptions are step up for optimization and an error model is established in step 900. This step 900 may include multiple sub-steps that will be described in FIG. 10. The process, in step 902, then searches for the optimum coefficients of the Legendre polynomials to determine the minimum IQM in the error model utilizing the BFGS method. In this example, the IQM is generally entropy ME or 4-norm M4 for sufficiently spaced reflectors. Then, in step 904, the process calculates the estimated NPAE using the optimum coefficients of the error model and compensates for the NPAE for the order one through $O_{npae}$ by applying the estimated NPAE to the azimuth compressed input data that has been PAE corrected (i.e., the PAE corrected data). The process between steps 900 and 904 is repeated for all the frequency steps in the chirp signal, which include step 1 through step M. Once all M steps have been processed, the decision step 906 (determines that the loop value is equal to M+1) passes the NPAE-1 corrected data to next sub-method 508 for calibration of the NPAE-2 amplitude errors.

Figure 10:
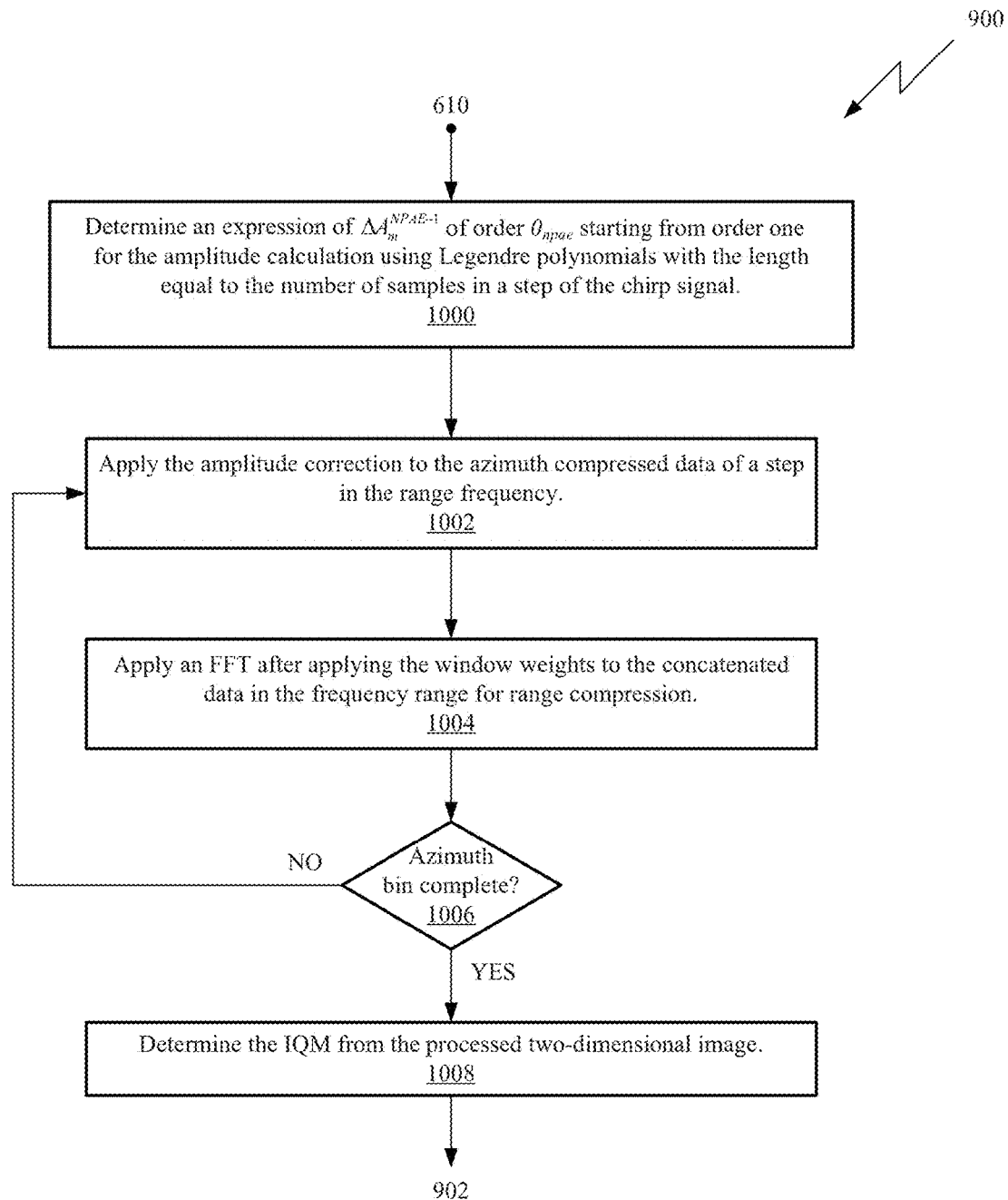
FIG. 10 is a flowchart of an example of an implementation of the sub-process for setting up the functional descriptions shown in FIG. 9 in accordance with the present invention.

In FIG. 10, a flowchart of an example of an implementation of the sub-process for setting up the functional descriptions of step 900 is shown in accordance with the present invention. The process receives the PAE corrected data for M frequency steps after PAE processing from step 610 and, in step 1000, determines an expression of $\Delta A_m^{NPPE-1}$ of order $O_{npae}$ starting from order one for the amplitude calculation using Legendre polynomials with the length equal to the number of samples in a step of the chirp signal. The process, in step 1002, then applies the correction amplitude to the azimuth compressed data of a step in the range frequency. The process, in step 1004, then applies an FFT after applying the window weights to the concatenated data in the frequency range for range compression. For a scene with sufficiently spaced point-like targets, the optimum weights for 4-norm $M_4$ can be applied to the data in the current step. Otherwise, the optimum weights for entropy $M_E$ are applied to the composite data from all steps.

The process then determines (in decision step 1006) if all the azimuth bins have been processed, if not the process repeats steps 1002 and 1004 until all the azimuth bins have been processed. Once all the azimuth bins have been processed, the process, in step 1008, then determines the IQM from the processed two-dimensional image, where the IQM may be entropy $M_E$ (described by equation #1) or $M_4$ (described by equation #2) for sufficiently spaced reflectors. The information is then passed to step 902 which searches for the optimum coefficients of the Legendre polynomials to determine the minimum IQM in the error model utilizing the BFGS method.

Figure 11:
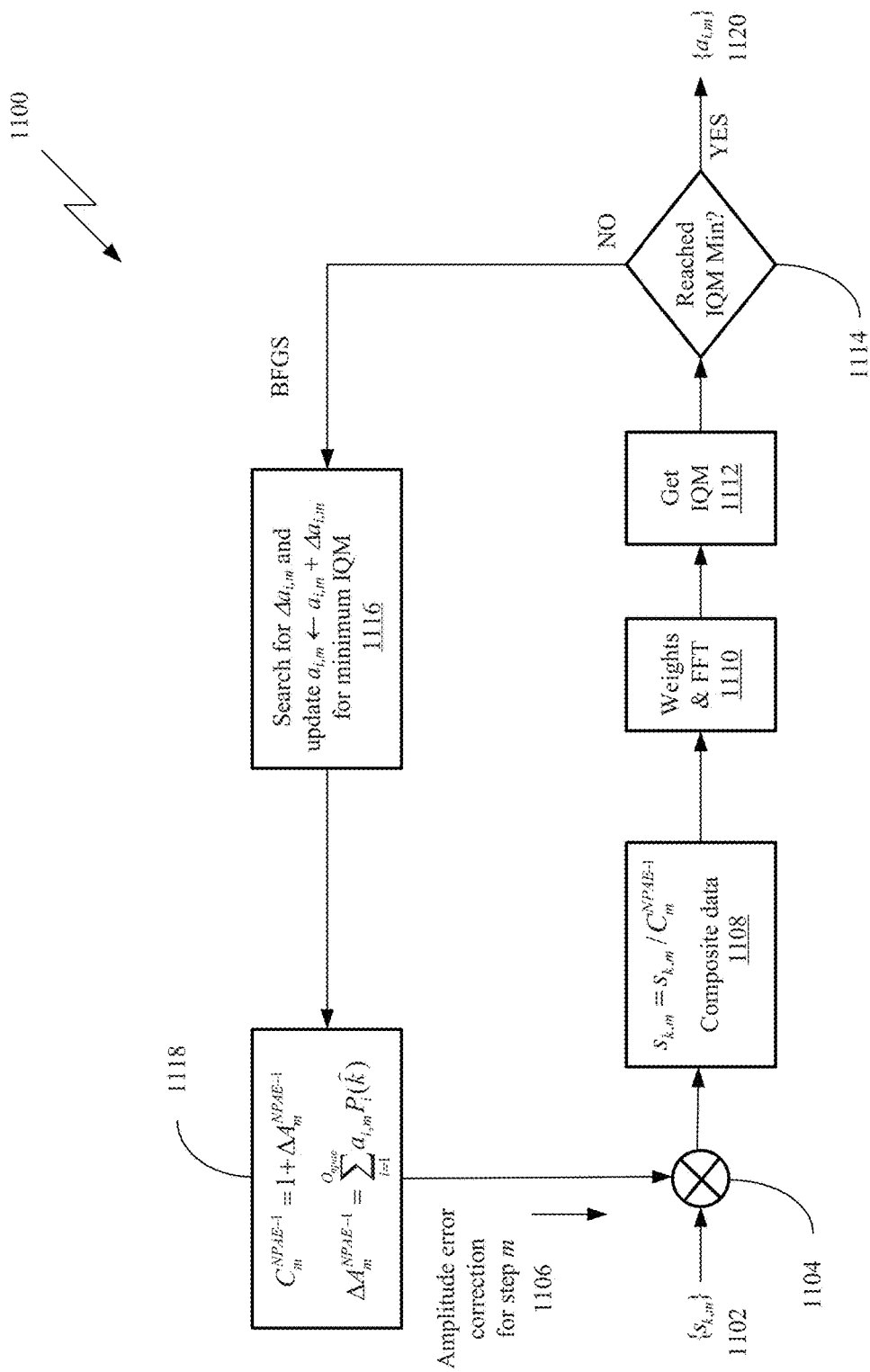
FIG. 11 is a functional flow diagram describing the process described in FIGS. 9 and 10 for the estimation of the type 1 non-periodic amplitude error ("NPAE-1") in accordance with the present invention.

Turning to FIG. 11, a functional flow diagram 1100 is shown further describing the process described earlier by the flowcharts shown in FIGS. 9 and 10 for the estimation of the NPAE-1 is shown in accordance with the present invention. In this example, the azimuth compressed data $\{s_{k,m}\}$ 1102 is multiplied 1104 by a NPAE-1 error correction value ("$C_m^{NPAE-1}$") 1106 and concatenated into the composite data $s_{k,m}=s_{k,m}C_m^{NPAE-1}$ 1108. Initially, the value of $C_m^{NPAE-1}$ 1106 is equal to 1. Window weights are applied to the concatenated data of the composite signal in the frequency range and an FFT is applied in functional block 1110. The process then determines the IQM from the processed two-dimensional image, where the IQM may be $M_E$ (described by equation #1) or $M_4$ (described by equation #2) in functional block 1112. If the minimum IQM is not reached (in decision block 1114), the process searches (in function block 1116) for the optimum coefficients of the Legendre polynomials to determine the minimum IQM in the error model utilizing the BFGS method. Specifically, the process searches for difference values of the coefficients ("$\Delta a_{i,m}$") and updates the coefficients ("$a_{i,m}$") by applying the difference values to the earlier coefficient, i.e., $a_{i,m}=a_{i,m}+\Delta a_{i,m}$. The updated coefficients are utilized, in functional block 1118, to determine the NPAE-1 amplitude error per the earlier described expression $$\Delta A_m^{NPPE-1} = \sum_{i=1}^{O_{npae}} a_{i,m} P_i(\hat{k}).$$

The $C_m^{NPAE-1}$ is then updated by the relationship $C_m^{NPAE-1}=1+\Delta A_m^{NPAE-1}$ and the new $C_m^{NPAE-1}$ 1106 is multiplied 1104 against the azimuth compressed data $\{s_{k,m}\}$ 1102 and functional flow process repeats until the minimum IQM is reached (in decision block 1114), the process then produces the optimized coefficient values $\{a_{l,m}\}$ 1120.

2. NPAE-2 Calibration

Although constant amplitude error does not affect image quality within each step they do cause amplitude discontinuities at step boundaries in the composite signal and therefore the image quality is degraded if they are not estimated and corrected prior to range compression. Since constant amplitude error does not affect the image quality, they cannot be estimated by observing changes in IQM in each step. An approach to estimate relative constant errors to suppress amplitude discontinuities at step boundaries is based on entropy $M_E$ of the image formed from the composite signal of two consecutive frequency steps. Applying a constant amplitude to the second half of the composite signal that comes from the second step of the pairing leads to changes in the quality of the image formed from the composite signal with the modified second half. In principle, the best image quality is obtained when the amplitude of the second segment is aligned to that of the first one with the same amplitude slope and no amplitude jump at the boundary of data from two steps.

The NPAE-2 calibration processing begins by taking data from the first two steps (PAE and NPAE-1 calibration) after the correction of the non-periodic amplitude error of order higher than zero in the NPAE-1 calibration. The process then sets an amplitude expression with constant amplitude error for the second frequency step. The amplitude is then applied to the data from the second step, the composite signal is generated from the two steps, and a Fourier transform is performed with a proper window function to produce an image. The process then searches for the optimum coefficients of the constant amplitude terms that lead to the minimum IQM of the formed image. This process of parameter search is a one-dimensional optimization problem and thus may be accomplished by a simple search algorithm such as the Golden Section ("SC") instead of the BFGS.

Next, the process updates the second half of the concatenated data by applying the amplitude (calculated using the optimum coefficients) to the initial data from the second step. This process is then repeated through the pairing of consecutive steps for the rest of steps. More specifically, the process takes the updated second step data with the modified amplitude and the new third step data, performs an optimization process and then updates the third step data as was done for second step in previous pairing with the first step. This process is repeated until the pairing up to the last step is completed. It should be noted that the amplitude of the first step data (that is presumed approximately constant after the processing for PAE and NPAE-1) is used as the reference to get the amplitude of all the other steps aligned to.

Figure 12:
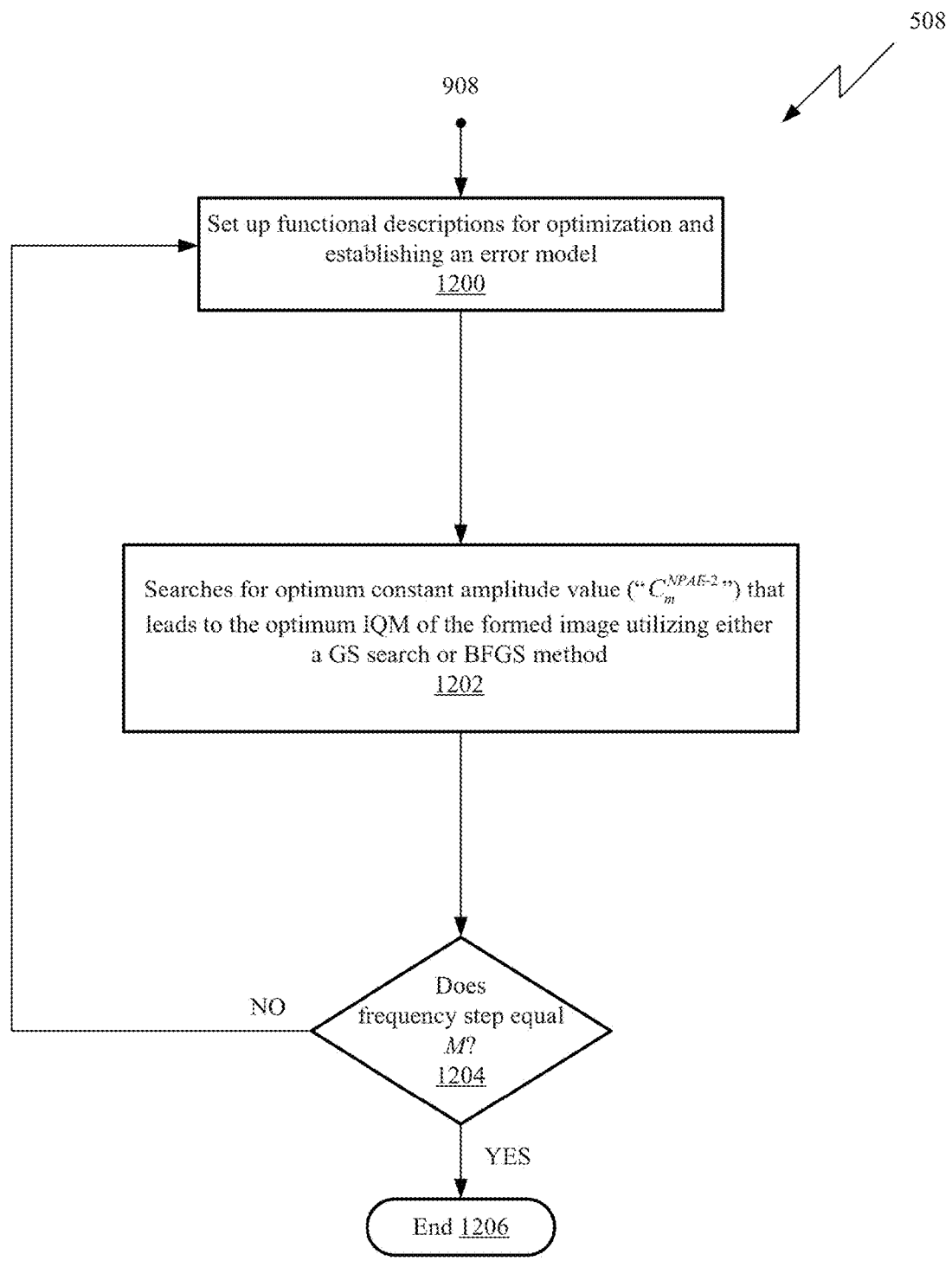
FIG. 12 is a flowchart of an example of implementation of the sub-method for preforming the NPAE-2 calibration shown in FIG. 5 in accordance with the present invention.

To better illustrate this process, the third sub-method (the NPAE-2 calibration 508 in FIG. 5) of the method performed by the RCP in determining the amplitude error is described in FIG. 12. In FIG. 12, a flowchart of an example of implementation of the sub-method for preforming the NPAE-2 calibration 508 is shown in accordance with the present invention. The process 908 starts by receiving the output data from NPAE-1 processing after correcting NPAE-1 of order one through $O_{npae}$. This two-dimensional data has the dimension of spatial azimuth and range frequency. Then functional descriptions are set up for optimization and an error model is established in step 1200. This, step 1200, may include multiple sub-steps that will be described in FIG. 13.

The process, in step 1202, then searches for optimum constant amplitude value ("$C_m^{NPAE-2}$") that leads to the optimum IQM of the formed image utilizing either a GS search or BFGS method.

The process between steps 1200 and 1202 is repeated to align the amplitude of step two through M to step one by pairing two consecutive steps. Once all M steps have been processed, the decision step 1204 (determines that loop value is equal to M) produces the resulting NPAE-2 corrected data and the process ends 1206.

Figure 13:
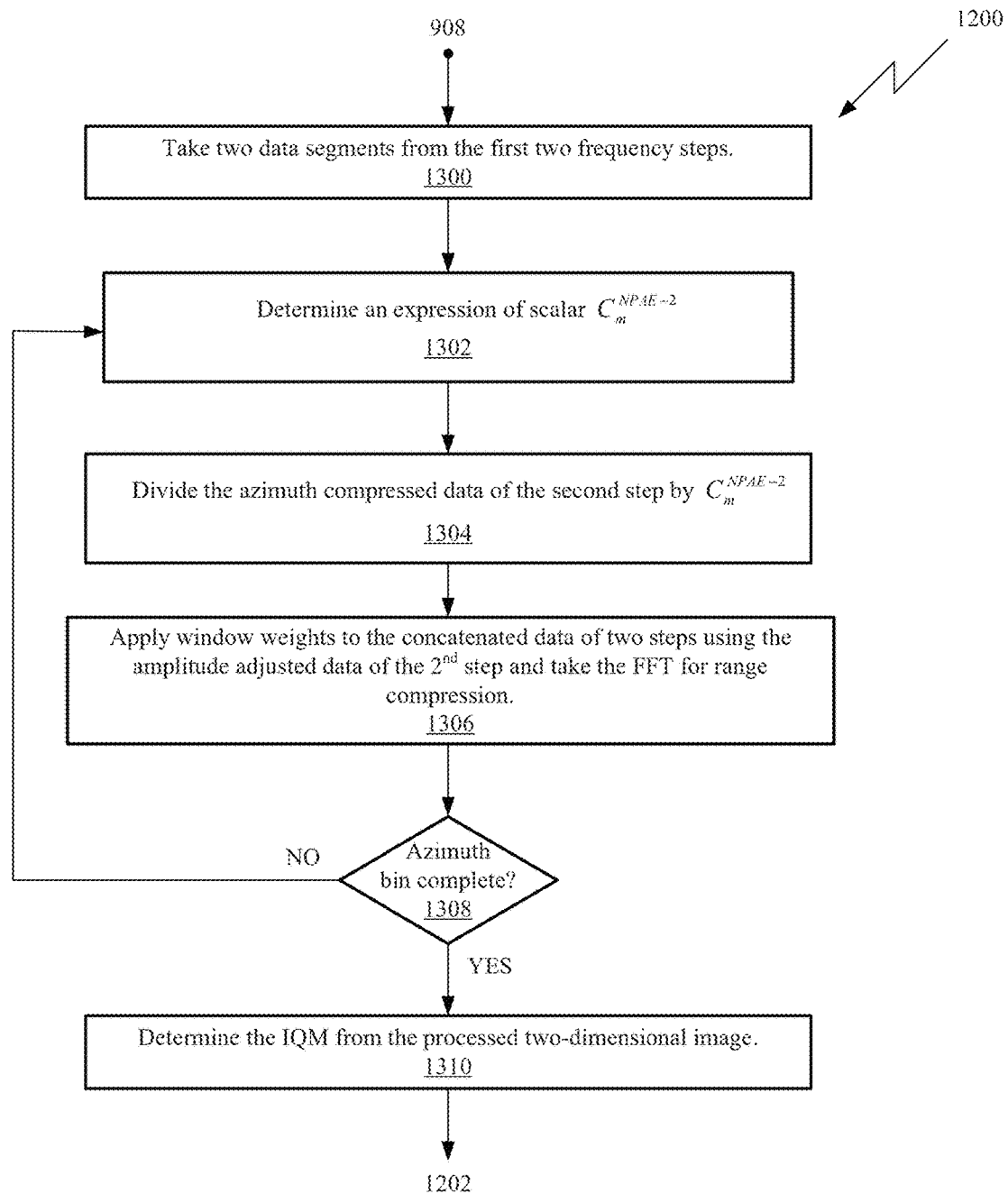
FIG. 13 is a flowchart of an example of an implementation of the sub-process for setting up the functional descriptions show in FIG. 12 in accordance with the present invention.

In FIG. 13, a flowchart of an example of an implementation of the sub-process for setting up the functional descriptions of step 1200 is shown in accordance with the present invention. The process receives the NPAE-1 corrected data for M frequency steps after NPAE-1 processing from step 908 and, in step 1300, takes two data segments from the first two frequency steps for m−1 and m. Then, in step 1302, it determines an expression for the optimum constant amplitude value $C_m^{NPPE-2}$, which is a scalar, and, in step 1304, divides the azimuth compressed data of the second step by $C_m^{NPPE-2}$. The process, in step 1306, then applies optimum weights for entropy $M_E$ to the concatenated data of two steps using the amplitude adjusted data of the second step and takes the FFT for range compression. The process then determines if all the azimuth bins have been processed, in decision step 1308, if not the process repeats steps 1302, 1304, and 1306 until all the azimuth bins have been processed. If all the azimuth bins have been processed, the process, in step 1310, then determines the IQM from the processed two-dimensional image formed from the composite data of the two steps, where the IQM may be $M_E$ (described by equation #1). The information is then passed to step 1202 which searches for the optimum $C_m^{NPAE-2}$ that leads to the optimum IQM of the formed image utilizing either a GS search or BFGS method.

Figure 14:
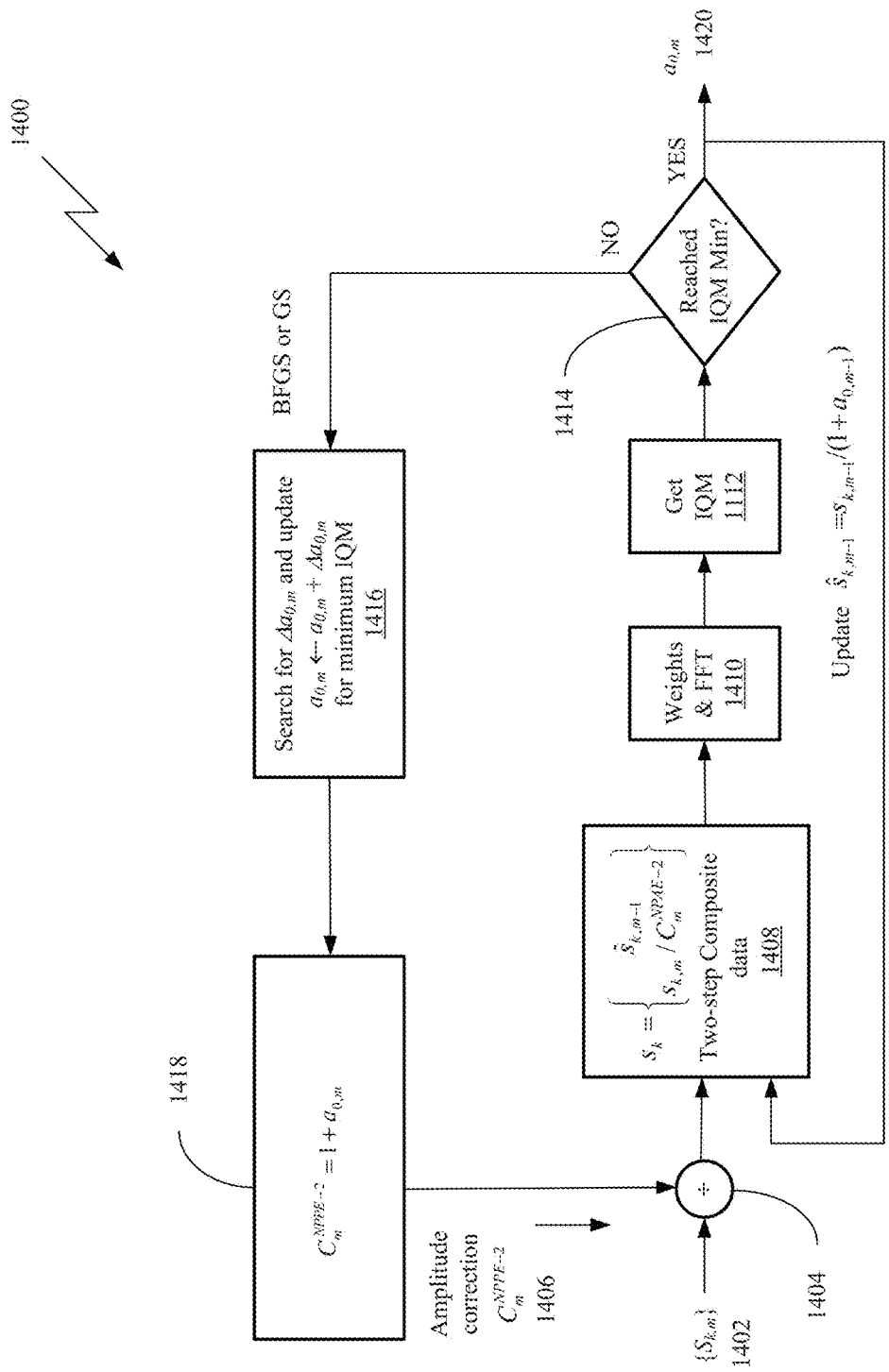
FIG. 14 is a functional flow diagram describing the process described in FIGS. 12 and 13 for the estimation of the type 2 non-periodic amplitude error ("NPAE-2") in accordance with the present invention.

Turning to FIG. 14, a functional flow diagram 1400 is shown further describing the process described earlier by the flowcharts shown in FIGS. 12 and 13 for the estimation of the NPAE-2 is shown in accordance with the present invention. The functional flow shows NPAE-2 processing by paring two steps starting with $\hat{s}_{k,1} = s_{k,1}$ for m equal to 2 through M.

In this example, the azimuth compressed data $\{s_{k,m}\}$ 1402 is divided 1404 by a NPAE-2 amplitude error correction value ("$C_m^{NPAE-2}$") 1406 with the starting index value of m equal to 2 and concatenated into the composite data $s_k$ 1408. Initially, the value of $C_m^{NPAE-2}$ 1406 is equal to 1. Optimum weights are applied to the concatenated data of the composite signal in the frequency range and an FFT is applied in functional block 1410. The process then determines the IQM from the processed two-dimensional image, where the IQM may be $M_E$ (described by equation #1) in functional block 1412. If the minimum IQM is not reached (in decision block 1414), the process searches (in function block 1416) for the optimum coefficients of the Legendre polynomials to determine the minimum IQM in the error model utilizing the BFGS method. Specifically, the process searches for difference values of the coefficients ("$\Delta a_{0,m}$") and updates the coefficients ("$a_{0,m}$") by applying the difference values to the earlier coefficient, i.e., $a_{0,m} = a_{0,m} + \Delta a_{0,m}$. The updated coefficients are utilized, in functional block 1418, to determine the NPAE-2 amplitude error per the expression and the $C_m^{NPAE-2}$ is then updated by the relationship $C_m^{NPAE-2} = 1 + a_{0,m}$ and the new $C_m^{NPAE-2}$ 1406 is used to divide 1404 the azimuth compressed data $\{s_{k,m}\}$ 1402 and the functional flow process repeats until the minimum IQM is reached (in decision block 1414), the process then produces the optimized coefficient values $a_{0,m}$ 1420 and updates $\hat{s}_{k,m-1}$.

It is noted that in this example, the composite signal 1408 is a two-step composite signal and $$s_k = \begin{Bmatrix} \hat{s}_{k,m-1} \\ s_{k,m}/C_m^{NPAE-2} \end{Bmatrix},$$

where $$\hat{s}_{k,m-1} = s_{k,m-1}/(1 + a_{0,m-1}).$$

Once the minimum IQM values are reached in, decision block 1414, $\hat{s}_{k,m-1}$ is updated and passed to the two-step composite functional block 1408 to produce an updated composite data.

The last part of the NPAE-2 calibration process adjusts the constant amplitude of steps 2 through M to align them to the first step to prevent jumps between steps. In general, if the first step has large amplitude offset, the composite signal after NPAE-2 calibration will have the same large amplitude offset. This undesirable potential amplitude offset may be reduced by utilizing the amplitude adjustment obtained in NPAE-2 processing. Specifically, for the dividing scalar $C_m^{NPAE-2}$ for steps m=2, 3, . . . M, the average amplitude adjustment is expressed as $$C_{offset} = \frac{1}{M-1}\sum_{m=2}^{M} C_m^{NPAE-2}.$$

Once average amplitude adjustment $C_{offset}$ (also referred to the amplitude offset scalar) is obtained, this constant gain is applied to the output of the NPAE-2 calibration ("$s^{NPAE-2}$" earlier referred amplitude corrected VPH data 270) to adjust the global amplitude adjustment for the final output as expressed by $$s_{aecal} = \frac{s^{NPAE-2}}{C_{offset}}$$

Where $s_{aecal}$ represents the global amplitude adjustment for the final output.

Figure 15:
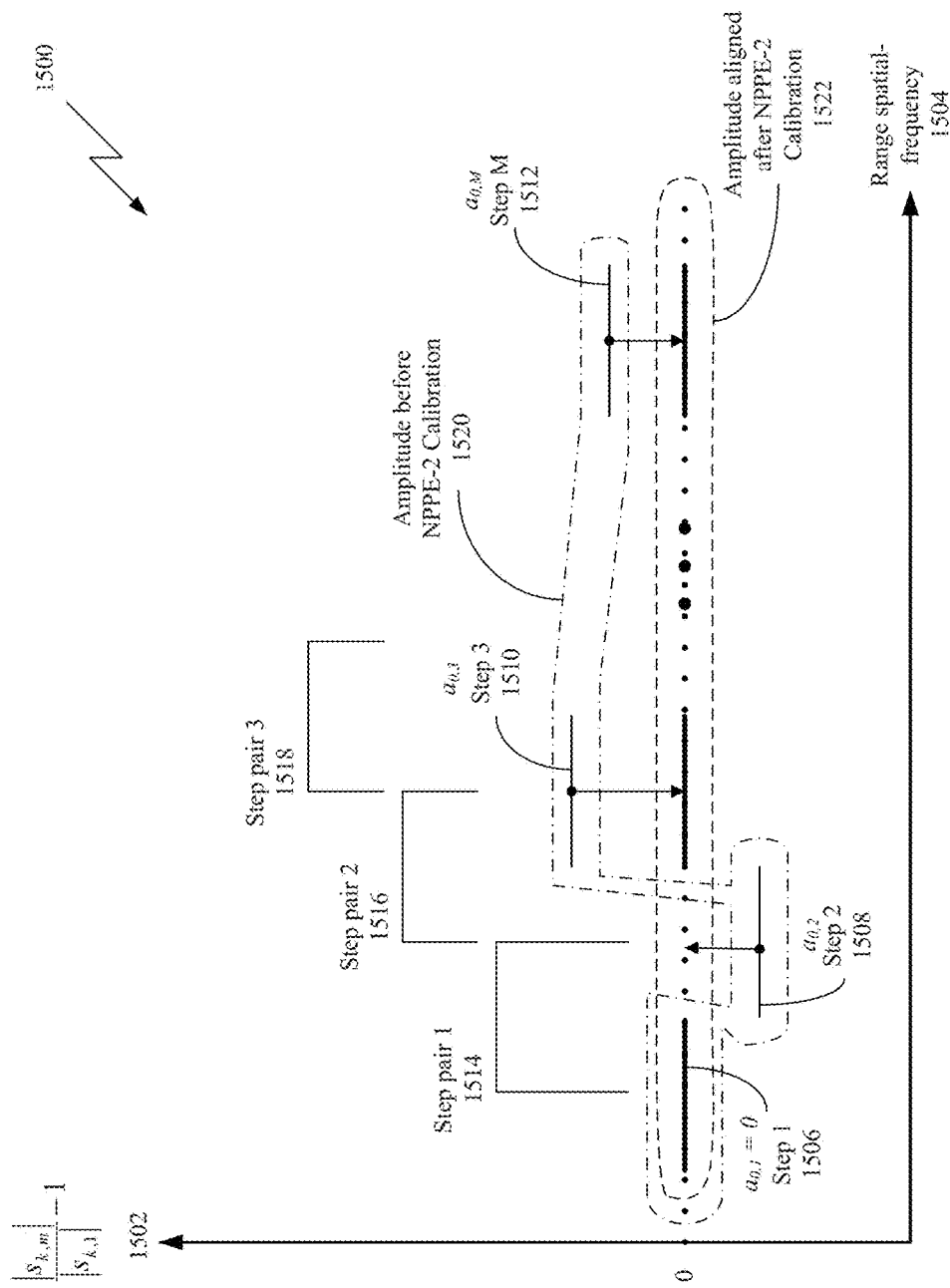
FIG. 15 is a plot of an example of implementation of amplitude adjustment process in accordance with the present invention.

In FIG. 15, a plot 1500 of an example of implementation of amplitude adjustment process is shown in accordance with the present invention. The plot 1500 shows M example steps plotted in normalized amplitude ("$|S_{k,m}|/|S_{k,1}|1$") 1502 versus range spatial-frequency 1504. Four example steps ($a_{0,1}$ 1506, $a_{0,2}$ 1508, $a_{0,3}$ 1510, and $a_{0,M}$ 1512) are shown at different amplitude values with the first step 1506 $a_{0,1}$ set to a normalized amplitude value of zero. Additionally, three step pairs (1514, 1516, and 1518) are also shown for estimating $a_{0,m}$. In this example, the first step pair 1514 is between step one 1506 and step two 1508. The second step pair 1516 is between step two 1508 and step three 1510. The third step pair 1518 is between step three 1510 and step four (not shown). The number of step pairs would include all the step pair up to step M–1 to and step M 1512. In this example, steps two 1508, step three 1510, through step M 1512 are shown originally in a group 1520 of amplitudes that correspond to the amplitude values after the NPAE-1 calibration but before NPAE-2 calibration. Once the data is processed by the NPAE-2 calibration the amplitudes of all the steps (1506, 1508, 1510, and 1512 shown in a new group 1522) have an amplitude that is equal to the amplitude of the first step $a_{0,1}$ 1506.

Utilizing the PAE and NPAE calibration methods, the total estimated amplitude error ("$\Delta A_{Est}$") is obtained from the estimates at the sequential calibration stages (i.e., the PAE calibration, NPAE-1 calibration, and NPAE-2 calibration) where $\Delta A_{Est}^{PAE}$ represents the estimated amplitude error in the PAE calibration stage, $\Delta A_{Est}^{NPAE-1}$ represents the estimated amplitude error in the NPAE-1 calibration stage, and $\Delta A_{Est}^{NPAE-1}$ represents the estimated amplitude error in the NPAE-2 calibration stage. The expression for obtaining the $\Delta A_{Est}$ is $$\Delta A_{Est} = \left[\frac{(1+\Delta A_{Est}^{PAE})(1+\Delta A_{Est}^{NPAE-1})(1+\Delta A_{Est}^{NPAE-2})}{C_{offset}}\right] - 1.$$

Figure 16:
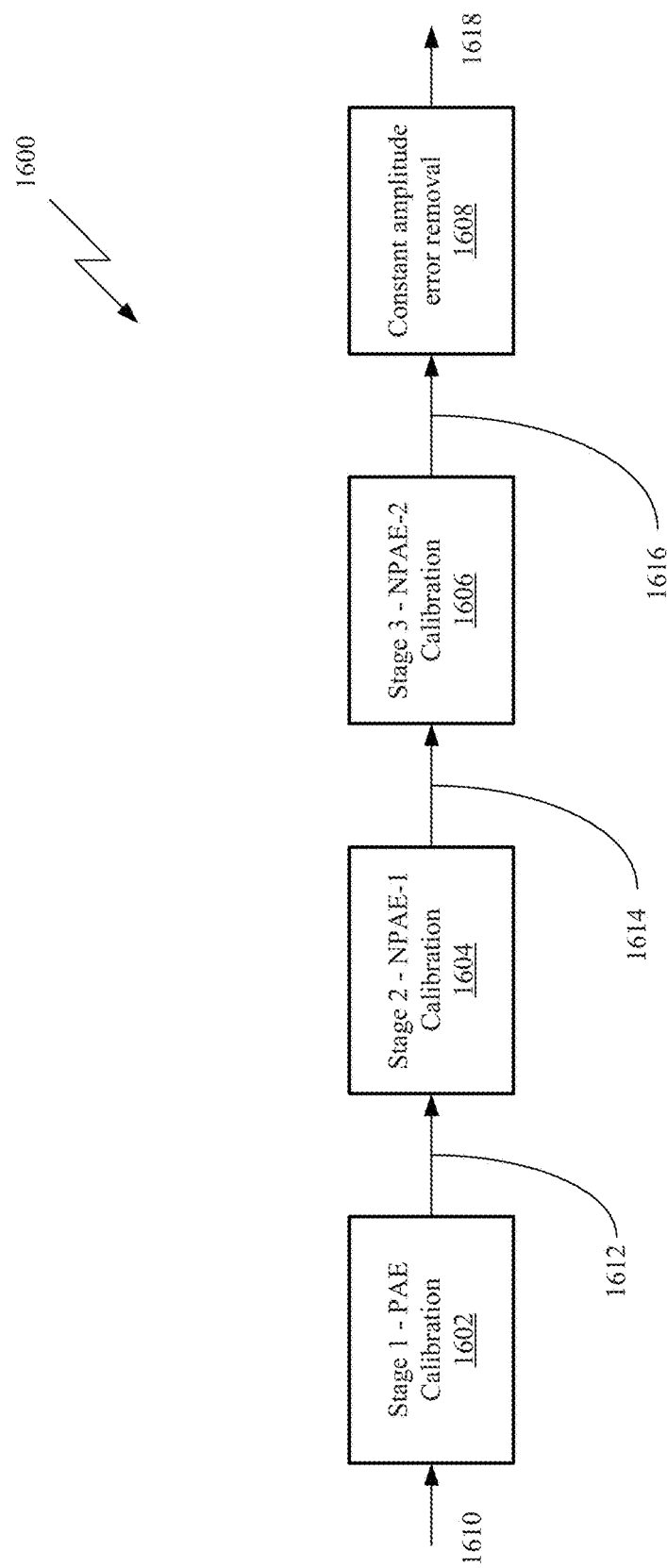
FIG. 16 is a block diagram showing three processing stages and constant amplitude error removal stage in accordance with the present invention.

As an example, to help illustrate the functioning of three processing stages and a constant amplitude adjustment described above, FIG. 16 shows a functional block diagram 1600 showing the three processing stages (a PAE calibration stage 1602, an NPAE-1 calibration stage 1604, and an NPAE-2 calibration stage 1606) and constant amplitude error removal stage 1608. The block diagram 1600 shows five test points 1610, 1612, 1614, 1616, and 1618 that will be discussed later. The first test point 1610 is prior to the first stage PAE calibration 1602. The second test point 1612 is after the first stage PAE calibration 1602 but prior to the second stage NPAE-1 calibration 1602. The third test point 1614 is after the second stage NPAE-1 calibration 1604 but prior to the third stage NPAE-2 calibration 1606. The fourth test point 1616 is after the third stage NPAE-2 calibration 1606 but prior to the constant amplitude error removal stage 1608. The fifth test point 1618 is post the constant amplitude error removal stage 1608. Using the block diagram 1600 described in FIG. 16, the effects of process on an applied signal injected into the first stage 1602 may be described.

As such, a test signal with an arbitrarily generated amplitude error that includes PAE and NPAE may be applied to one-dimensional data to show the performance of the presently described method with intermediate results shown at five test points 1610, 1612, 1614, 1616, and 1618. The results are shown in FIGS. 17A through 18D.

FIG. 17A shows a plot 1700 of the initial input amplitude error as a function of amplitude 1702 versus range frequency samples 1704. FIGS. 17A and 17B show the amplitude with errors before and after the first stage PAE calibration 1602 at test points 1610 and 1612. FIG. 17A shows a plot 1700 of the amplitude before PAE calibration 1602 (i.e., at test point 1610) of order one through five. FIG. 17B shows a plot 1706 of the amplitude after PAE calibration 1602 (i.e., at test point 1612) of order one through five. FIGS. 17C and 17D show plots 1708 and 1710 of the corresponding impulse responses ("IPRs") that has been degraded due to the amplitude errors as a function of amplitude 1712 versus range frequency samples 1714. FIG. 17C shows the plot 1708 of the IPR prior to PAE calibration 1602 (at test point 1610) with Taylor weights. FIG. 17D shows the plot 1710 of the IPR after PAE calibration 1602 (at test point 1612) with Taylor weights.

FIG. 18A through 18D show amplitude errors after the second stage NPAE-1 calibration 1604 and after the third stage NPAE-1 calibration 1604 at test points 1614 and 1616. FIG. 18A shows a plot 1800 of the amplitude error after second stage NPAE-1 calibration 1604 (at test point 1614) as a function of amplitude 1802 versus range frequency samples 1804. FIG. 18B shows a plot 1806 of the amplitude error after the third stage NPAE-2 calibration 1606 (at point 1616).

FIGS. 18C and 18D show plots 1808 and 1810 of the corresponding IPRs that has been degraded due to the amplitude errors as a function of amplitude 1812 (in decibels) versus range frequency samples 1814. FIG. 18C shows the plot 1808 of the IPR prior to NPAE-2 calibration 1606 (at test point 1614) with Taylor weights but after NPAE-1 calibration 1604. FIG. 18D shows the plot 1810 of the IPR after NPAE-2 calibration 1606 (at test point 1616) with Taylor weights. In this example, the weight may be −40 dB Taylor weights.

From these results for the test signal, it is appreciated that in FIG. 18B an amplitude offset is seen of about 0.05 without a constant amplitude adjustment. The value seen is about 1.05 1816 but the amplitude 1816 is normalized to the value of 1 so the difference is 0.05. From the results of the NPAE-2 calibration 1606, the amplitude offset could be obtained as $C_{offset}=1.047$. After the amplitude adjustment with $C_{offset}$ with the constant amplitude error removal stage 1608 (at test point 1618), the actual and estimated period, non-periodic, and total amplitude errors may be compared in FIGS. 19A through 19C. In FIG. 19A, plots of the actual 1900 and estimated 1902 PAE errors are show as a function of amplitude 1904 versus range frequency samples 1906, where the solid line 1900 is the actual PAE error and the dotted line 1902 is the estimated PAE error. FIG. 19B shows plots of the actual 1908 and estimated 1910 NPAE errors as a function of amplitude 1904 versus range frequency samples 1906, where the solid line 1908 is the actual NPAE error and the dotted line 1910 is the estimated NPAE error. In FIG. 19C, plots of the actual 1912 and estimated 1914 combined PAE and NPAE errors are show as a function of amplitude 1904 versus range frequency samples 1906, where the solid line 1912 is the actual combined PAE and NPAE error and the dotted line 1914 is the estimated combined PAE and NPAE error.

Figure 20A:
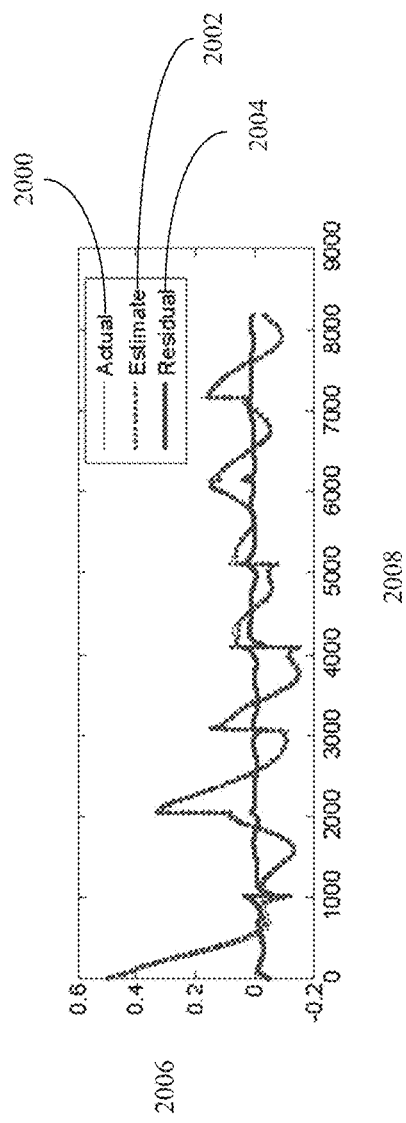
FIG. 20A is a plot of the actual, estimated, and residual total amplitude error with amplitude adjustments as a function of amplitude versus range frequency.
Figure 20B:
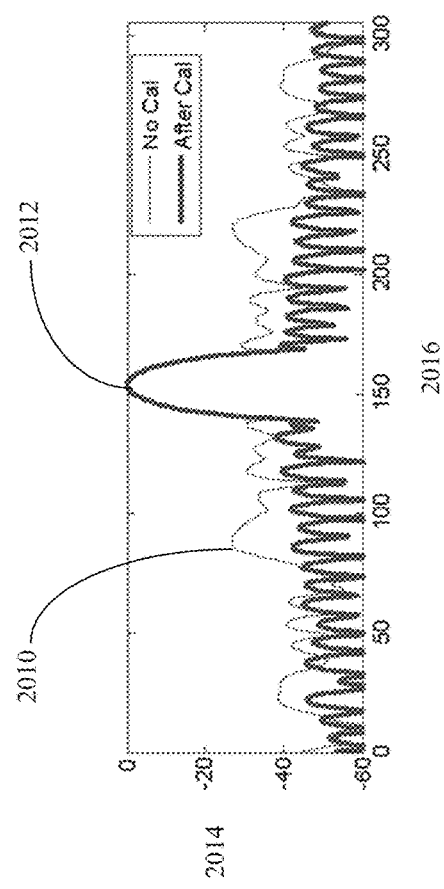
FIG. 20B is a plot of the corresponding IPR (of the plots of FIG. 20A) before and after calibration as a function of amplitude versus range frequency.

Turning to FIG. 20A, plots of the actual 2000, estimated 2002, and residual 2004 total amplitude error with amplitude adjustment are shown as a function of amplitude 2006 versus range frequency samples 2008. FIG. 20B shows plots of the corresponding IPRs before 2010 and after 2012 calibration as a function of amplitude 2014 (in decibels) versus range frequency samples 2016. For these figures it is appreciated that the residual amplitude error (as shown in plot 2004) is almost equal to zero.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A Radar Calibration Processor ("RCP") for calibrating the amplitude of a stepped-chirp signal utilized by a synthetic aperture radar ("SAR") to produce SAR display images, the RCP comprising:
a periodic amplitude error ("PAE") calibrator;
a first non-periodic amplitude error ("NPAE") calibrator; and
a second NPAE calibrator,
wherein the first NPAE calibrator is in signal communication with both the PAE calibrator;
wherein the PAE calibrator is configured to receive video phase history ("VPH") data from the SAR and, in response, produces PAE calibrated data from the VPH data and wherein the VPH data includes a plurality of steps within a stepped-chirped waveform and a range frequency; and
wherein the PAE calibrator is further configured to perform an azimuth compression on the VPH data to produce azimuth compressed input data, concatenate the azimuth compressed input data into concatenated data, define functional descriptions for optimization of the azimuth compressed input data, establish an error model based on the functional descriptions, search for optimum coefficients of one or more Legendre polynomials to determine a minimum image quality metric ("IQM") for the error model, determine an estimated PAE using the optimum coefficients of the error model, and apply the estimated PAE to the azimuth compressed input data.

2. The RCP of claim 1, wherein the configuration of the PAE calibrator to define the functional descriptions for optimization includes
(a) determining an expression for a PAE amplitude error of order $O_{pac}$ starting from an order one for a amplitude calculation using Legendre polynomials with a length equal to a number of samples in a step, of the plurality of steps, of the stepped-chirp waveform, wherein the number of samples include a first sample and a last sample
(b) applying a amplitude correction for the PAE amplitude error to the azimuth compressed data of all the steps in the range frequency,
(c) applying window weights to the concatenated data in the frequency range,
(d) applying a fast Fourier transform ("FFT") on the concatenated data for range compression,
(e) repeating the steps (b) through (d) from the first sample to the last sample to produce a processed two-dimensional image, and
(f) determining the IQM from the processed two-dimensional image.

3. The RCP of claim 2, wherein the first NPAE ("NPAE-1") calibrator is configured to receive the PAE calibrated data having M frequency steps and, in response, produces NPAE-1 calibrated data, which has been calibrated for type-1 NP AE.

4. The RCP of claim 3, wherein the NPAE-1 calibrator is configured to
(a) define functional descriptions for optimization and establishing an error model for a NPAE-1 amplitude error,
(b) search for optimum coefficients of Legendre polynomials to determine a minimum IQM in the error model for the NPAE-1 amplitude error utilizing a Broyden-Fletcher-Goldfarb-Shanno ("BFGS") algorithm,
(c) determine an estimated NPAE-1 amplitude error using the optimum coefficients of the error model for a NPAE-1 amplitude error,
(d) apply the estimated NPAE to the azimuth compressed input data, wherein the NPAE-1 amplitude error is compensated for the order one through $O_{npae}$, and
(e) repeat steps (a) through (d) until all M frequency steps have been processed.

5. The RCP of claim 4, wherein the configuration of the NPAE-1 calibrator to define the functional descriptions for optimization includes
  (a) determining an expression of the NPAE-1 amplitude error of order $O_{pae}$ starting from order one for an amplitude calculation using Legendre polynomials with the length equal to a number of samples in a step, of the plurality of steps, of the stepped-chirp waveform, wherein the number of samples include a first sample and a last sample,
  (b) applying the amplitude correction to the azimuth compressed data of a step in the range frequency,
  (c) applying window weights to the concatenated data in the frequency range,
  (d) applying a fast Fourier transform ("FFT") on the concatenated data for range compression,
  (e) repeating the steps (b) through (d) from the first sample to the last sample to produce a processed two-dimensional image, and
  (f) determining the IQM from the processed two-dimensional image.

6. The RCP of claim 5, wherein the second NPAE ("NPAE-2") calibrator is configured to receive the NPAE-1 calibrated data and, in response, produces NPAE-2 calibrated data, which has been calibrated for type-2 NPAE.

7. The RCP of claim 6, wherein the NPAE-2 calibrator is configured to
  (a) define functional descriptions for optimization and establishing an error model for a NPAE-2 amplitude error,
  (b) search for optimum constant amplitude value that leads to the optimum IQM utilizing a Broyden-Fletcher-Goldfarb-Shanno ("BFGS") algorithm,
  (c) determine an estimated NP AE amplitude error using the constant amplitude value of the error model for the NPAE-2 amplitude error,
  (d) repeat steps (a) through (c) until all M frequency steps have been processed.

8. The RCP of claim 7, wherein the configuration of the NPAE-2 calibrator to define the functional descriptions for optimization includes
  (a) taking two data segments from a first and a second frequency steps of the M frequency steps,
  (b) determining an expression of the common amplitude error of a first step for an amplitude correction,
  (c) dividing the azimuth compressed data of a second step with the common amplitude error,
  (d) applying window weights to a concatenated data of the first and second steps using the amplitude adjusted data of the second step,
  (e) applying a fast Fourier transform ("FFT") on the concatenated data for range compression,
  (f) repeating the steps (b) through (e) from the first sample to the last sample to produce a processed two-dimensional image, and
  (g) determining the IQM from the processed two-dimensional image.

9. The RCP of claim 8, wherein the RCP is configured to adjust constant amplitude of all the M-1 steps in order to align them to the first step.

10. The RCP of claim 9, further including an antenna gain calibrator.

11. A method for calibrating the amplitude of a stepped-chirp signal utilized by a synthetic aperture radar ("SAR") to produce SAR display images, the method comprising:
  estimating a periodic amplitude error ("PAE");
  estimating a first non-periodic amplitude error ("NPAE"); and
  estimating for a second NPAE calibration after the first NPAE ("NPAE-1") has been estimated; and
  wherein estimating the PAE includes
    receiving video phase history ("VPH") data from the SAR and
    producing a PAE calibrated data from the VPH data in response to receiving the VPH data and
  wherein the VPH data includes a plurality of steps within a stepped-chirped waveform and a range frequency.

12. The method of claim 11, wherein estimating the PAE further includes
  performing an azimuth compression on the VPH data to produce azimuth compressed input data,
  concatenating the azimuth compressed input data into concatenated data,
  defining functional descriptions for optimization of the azimuth compressed input data,
  establishing an error model based on the functional descriptions,
  searching for optimum coefficients of one or more Legendre polynomials to determine a minimum image quality metric ("IQM") for the error model,
  determining an estimated PAE using the optimum coefficients of the error model, and
  applying the estimated PAE to the azimuth compressed input data.

13. The method of claim 12, wherein defining functional descriptions for optimization includes
  (a) determining an expression for a PAE amplitude error of order $O_{pae}$, starting from an order one for a amplitude calculation using Legendre polynomials with a length equal to a number of samples in a step, of the plurality of steps, of the stepped-chirp waveform, wherein the number of samples include a first sample and a last sample,
  (b) applying an amplitude correction for the PAE amplitude error to the azimuth compressed data of all the steps in the range frequency,
  (c) applying window weights to the concatenated data in the frequency range,
  (d) applying a fast Fourier transform ("FFT") on the concatenated data for range compression,
  (e) repeating the steps (b) through (d) from the first sample to the last sample to produce a processed two-dimensional image, and
  (f) determining the IQM from the processed two-dimensional image.

14. The method of claim 13, wherein estimating the NPAE-1 amplitude error includes
  receiving the PAE calibrated data having M frequency steps and
  producing NPAE-1 calibrated data, which has been calibrated for type-1 NPAE, in response to receiving the PAE calibrated data.

15. The method of claim 14, wherein the estimating the NPAE-1 amplitude error further includes
  (a) defining functional descriptions for optimization and establishing an error model for a NPAE-1 amplitude error,
  (b) searching for optimum coefficients of Legendre polynomials to determine a minimum IQM in the error model for the NPAE-1 amplitude error utilizing a Broyden-Fletcher-Goldfarb-Shanno ("BFGS") algorithm, (c) determining an estimated NPAE-1 amplitude error using the optimum coefficients of the error model for a NPAE-1 amplitude error, (d) applying the estimated NPAE to the azimuth compressed input data, wherein the NPAE-1 amplitude error is compensated for the order one through $O_{npae}$ and (e) repeating steps (a) through (d) until all M frequency steps have been processed.

16. The method of claim 15, wherein defining functional descriptions for optimization includes (a) determining an expression of the NPAE-1 amplitude error of order $O_{pae}$ starting from order one for an amplitude calculation using Legendre polynomials with the length equal to a number of samples in a step, of the plurality of steps, of the stepped-chirp waveform, wherein the number of samples include a first sample and a last sample, (b) applying the amplitude correction to the azimuth compressed data of a step in the range frequency, (c) applying window weights to the concatenated data in the frequency range, (d) applying a fast Fourier transform ("FFT") on the concatenated data for range compression, (e) repeating the steps (b) through (d) from the first sample to the last sample to produce a processed two-dimensional image, and (f) determining the IQM from the processed two-dimensional image.

17. The method of claim 16, wherein estimating the NPAE-2 amplitude error includes receiving the NPAE-1 calibrated data and producing NPAE-2 calibrated data, which has been calibrated for type-2 NPAE, in response to receiving the NPAE-1 calibrated data.

18. The method of claim 17, wherein estimating the NPAE-2 amplitude error further includes (a) defining functional descriptions for optimization and establishing an error model for a NPAE-2 amplitude error, (b) searching for optimum coefficients of Legendre polynomials of order zero to determine a minimum IQM in the error model for the NPAE-2 amplitude error utilizing a Broyden-Fletcher-Goldfarb-Shanno ("BFGS") algorithm, (c) determining an 0 order NPAE amplitude error using the optimum coefficients of the error model for the NPAE-2 amplitude error, (d) repeating steps (a) through (c) until all M frequency steps have been processed.

19. The method of claim 18, wherein defining functional descriptions for optimization includes (a) taking two data segments from a first and a second frequency steps of the M frequency steps, (b) determining an expression of the NPAE-2 amplitude error for a amplitude correction using Legendre polynomials of order zero with a length equal to the number of range frequency samples in the second step, (c) applying the amplitude correction in the range frequency of the azimuth compressed data of the second step, (d) applying window weights to a concatenated data of the first and second steps using the amplitude adjusted data of the second step, (e) applying a fast Fourier transform ("FFT") on the concatenated data for range compression, (f) repeating the steps (b) through (e) from the first sample to the last sample to produce a processed two-dimensional image, and (g) determining the IQM from the processed two-dimensional image.

20. The method of claim 19, further including adjusting constant of all the M−1 steps in order to align them to the first step.

21. The method of claim 20, further including calibrating an antenna gain prior to estimating the PAE amplitude error.

22. A Radar Calibration Processor ("RCP") for calibrating the amplitude of a stepped-chirp signal utilized by a synthetic aperture radar ("SAR") to produce SAR display images, the RCP comprising:

means for estimating a periodic amplitude error ("PAE");

means for estimating a first non-periodic amplitude error ("NPAE") after the estimating the PAE; and means for estimating a second NPAE after estimating the first NPAE, wherein the means for estimating first NPAE is in signal communication with both the means for estimating the PAE and the means for estimating the second NPAE.

* * * * *